US011440466B2

(12) United States Patent
Kawaguchi et al.

(10) Patent No.: US 11,440,466 B2
(45) Date of Patent: *Sep. 13, 2022

(54) SEMICONDUCTOR DEVICE AND MESSAGE IMAGE SIGNAL OUTPUT METHOD

(71) Applicant: RENESAS ELECTRONICS CORPORATION, Tokyo (JP)

(72) Inventors: Hirofumi Kawaguchi, Tokyo (JP); Koji Yasuda, Tokyo (JP); Akihide Takahashi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 503 days.

This patent is subject to a terminal disclaimer.

(21) Appl. No.: 16/435,040

(22) Filed: Jun. 7, 2019

(65) Prior Publication Data

US 2019/0389370 A1 Dec. 26, 2019

(30) Foreign Application Priority Data

Jun. 21, 2018 (JP) .............................. JP2018-118017

(51) Int. Cl.
*B60Q 1/50* (2006.01)
*G01C 21/36* (2006.01)
(Continued)

(52) U.S. Cl.
CPC .............. *B60Q 1/50* (2013.01); *G01C 21/365* (2013.01); *G06T 5/20* (2013.01); *G08G 1/096861* (2013.01); *H04N 9/73* (2013.01)

(58) Field of Classification Search
CPC .......... B60Q 1/50; G01C 21/365; G06T 5/20; G08G 1/096861; H04N 9/73
(Continued)

(56) References Cited

U.S. PATENT DOCUMENTS

2008/0062164 A1 3/2008 Bassi et al.
2012/0044090 A1* 2/2012 Kahler ..................... B60Q 1/50
340/905

(Continued)

FOREIGN PATENT DOCUMENTS

| JP | 2008-143505 A | 6/2008 |
| WO | 2015/194131 A1 | 12/2015 |
| WO | 2016/114048 A1 | 7/2016 |

OTHER PUBLICATIONS

Partial European Search Report issued in corresponding European Patent Application No. 19180486.3-1209, dated Nov. 28, 2019.

*Primary Examiner* — Krishnan Ramesh
(74) *Attorney, Agent, or Firm* — McDermott Will & Emery LLP

(57) ABSTRACT

A semiconductor device has a position estimation part calculating an estimated position of a mobile at a scheduled time to project a message image, based on movement information of the mobile, a reference image signal output part deciding a reference area being an area to project a reference image, based on a relative positional relation between the mobile at the estimated position and the projection area, and outputting a reference image signal being a signal of the reference image, a test image signal acquisition part acquiring a test image signal being a signal of an image obtained by imaging the reference area with the reference image projected thereon, and an image adjustment part adjusting the message image signal, based on the reference image signal and the test image signal.

19 Claims, 25 Drawing Sheets

(51) Int. Cl.
  *G06T 5/20*      (2006.01)
  *G08G 1/0968*    (2006.01)
  *H04N 9/73*      (2006.01)

(58) Field of Classification Search
  USPC .......................................................... 701/28
  See application file for complete search history.

(56) References Cited

U.S. PATENT DOCUMENTS

| | | | |
|---|---|---|---|
| 2013/0141699 A1* | 6/2013 | Yamamoto | G09G 3/3413 |
| | | | 353/31 |
| 2018/0004020 A1* | 1/2018 | Kunii | B60Q 1/04 |
| 2018/0090011 A1* | 3/2018 | Morel | G08G 1/167 |
| 2018/0118099 A1 | 5/2018 | Kunii et al. | |
| 2019/0116345 A1* | 4/2019 | Albou | G01C 21/365 |
| 2019/0166338 A1* | 5/2019 | Greenwood | G06V 20/56 |
| 2019/0297306 A1* | 9/2019 | Narikawa | H04N 9/3191 |
| 2020/0081329 A1* | 3/2020 | Cheng | H04N 9/3194 |
| 2020/0152065 A1* | 5/2020 | Hada | B60W 50/14 |

\* cited by examiner

TIME: t0+Δt

FIG. 22
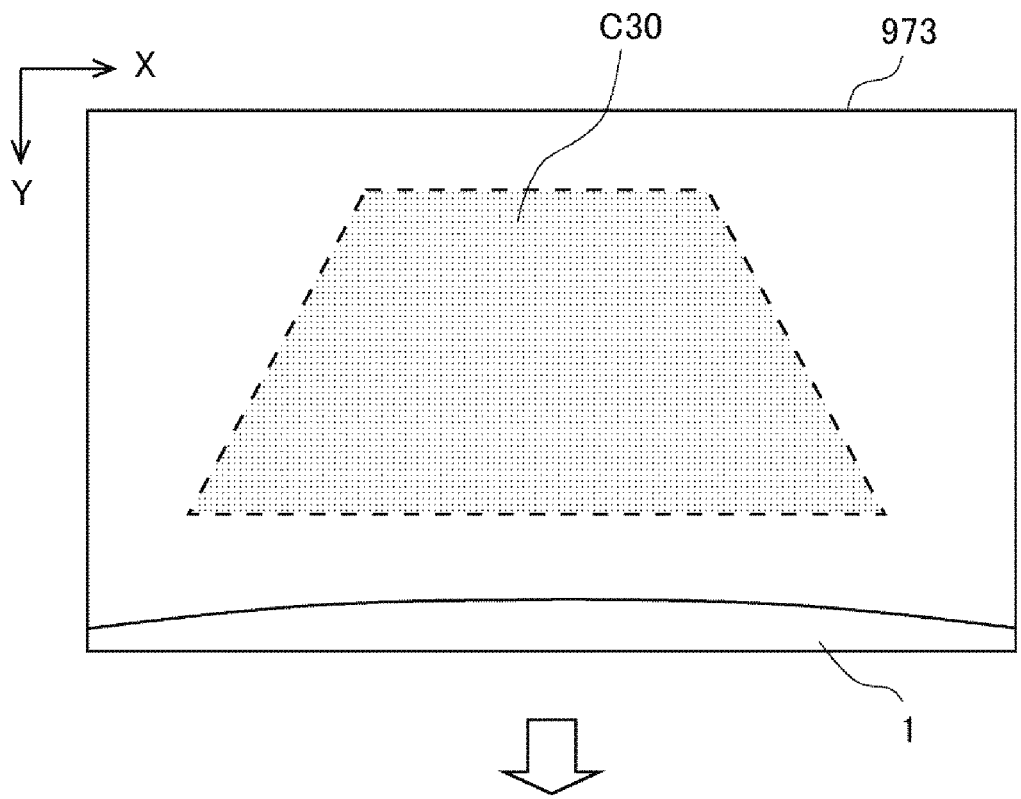
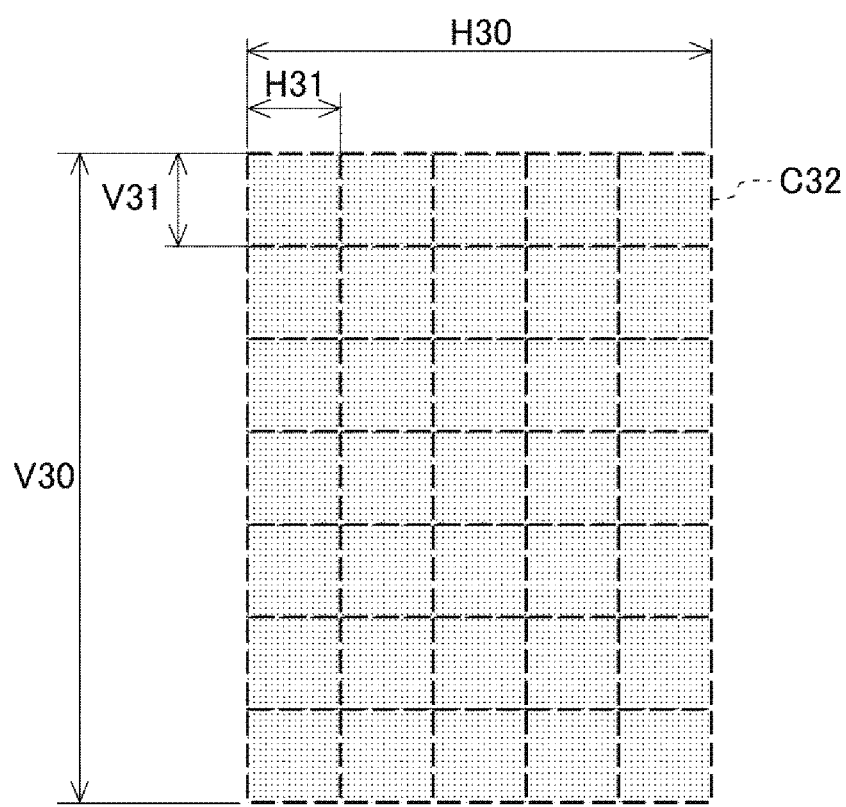

FIG. 25
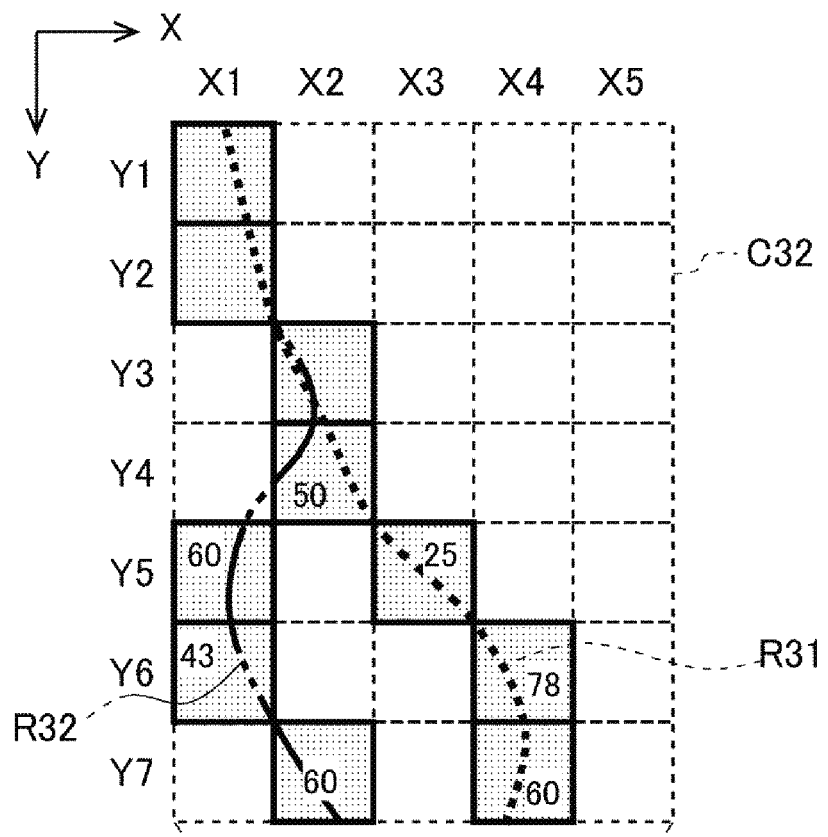
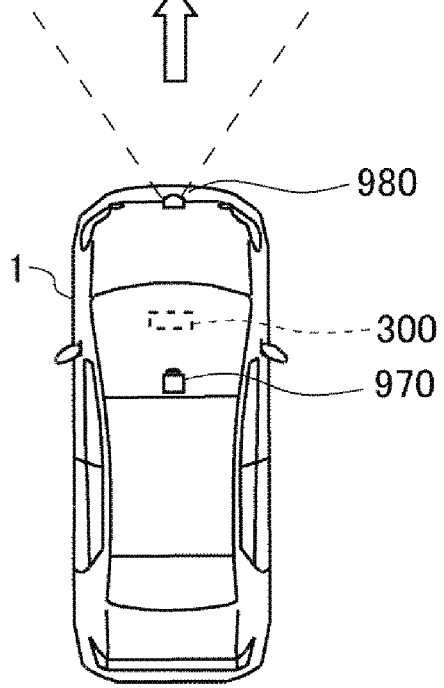

SEMICONDUCTOR DEVICE AND MESSAGE IMAGE SIGNAL OUTPUT METHOD

CROSS-REFERENCE TO RELATED APPLICATIONS

The disclosure of Japanese Patent Application No. 2018-118017 filed on Jun. 21, 2018 including the specification, drawings and abstract is incorporated herein by reference in its entirety.

BACKGROUND

The present invention relates to a semiconductor device, and a message image signal output method.

There have been proposed various techniques of projecting light including predetermined information around a vehicle, based on information about the vehicle, etc.

For example, an image projecting device described in Patent Document 1 is equipped with an acquisition part which acquires information about a vehicle, and an image projecting part which projects an image or the like including a predetermined message or the like according to the acquired information.

Further, a headlight control device described in Patent Document 2 is equipped with a signal acquisition means which acquires detection signals from a vehicle running state detection device and a running road condition detection device, and a projection image control means which decides a projection image, based on the acquired detection signals, and controls a projection part to generate the projection image.

RELATED ART DOCUMENTS

Patent Document

[Patent Document 1] International Unexamined Patent Application No. 2016/114048
[Patent Document 2] Japanese Unexamined Patent Application Publication No. 2008-143505

SUMMARY

These documents however have no descriptions and suggestions concerning that whether images or the like projected onto a road surface or the like are aspects recognizable for a driver or the like who should recognize them is considered to be a problem.

Other objects and novel features will become apparent from the description of the present specification and the accompanying drawings.

According to one embodiment, there is provided a semiconductor device which outputs a message image signal being a signal of a message image to be projected onto a projection area located at a predetermined distance from a mobile. Also, the semiconductor device has a position estimation part which calculates an estimation position of the mobile at a scheduled time to project the message image on the basis of movement information of the mobile. Further, the semiconductor device has a reference image signal output part which decides a reference area being an area to project a reference image on the basis of a relative positional relation between the mobile at the estimation position and the projection area, and outputs a reference image signal being a signal of the reference image. Furthermore, the semiconductor device has a test image signal acquisition part which acquires a test image signal being a signal of an image obtained by capturing the reference area onto which the reference image is projected. Additionally, the semiconductor device has an image adjustment part which adjusts the message image signal based on the reference image signal and the test image signal.

According to another embodiment, there is provided a message image signal output method of outputting a message image signal being a signal of a message image to be projected onto a projection area located at a predetermined distance from a mobile. Also, the message image signal output method includes a step of calculating an estimation position of the mobile at a scheduled time to project the message image on the basis of movement information of the mobile. Further, the message image signal output method includes a step of deciding a reference area being an area to project a reference image on the basis of a relative positional relation between the mobile at the estimation position and the projection area, and outputting a reference image signal being a signal of the reference image. Furthermore, the message image signal output method includes a step of acquiring a test image signal being a signal of an image obtained by capturing the reference area onto which the reference image is projected. Additionally, the message image signal output method includes a step of adjusting the message image signal based on the reference image signal and the test image signal.

According to one embodiment, it is possible to provide a semiconductor device or the like which suppresses deterioration in an image due to being affected by a projection surface.

BRIEF DESCRIPTION OF THE DRAWINGS

FIG. 22 is a diagram for describing a state of processing a reference image signal in a grid form;

FIG. 25 is a diagram for describing an example of processing of an optimum route decision circuit.

DETAILED DESCRIPTION

Figure 1:
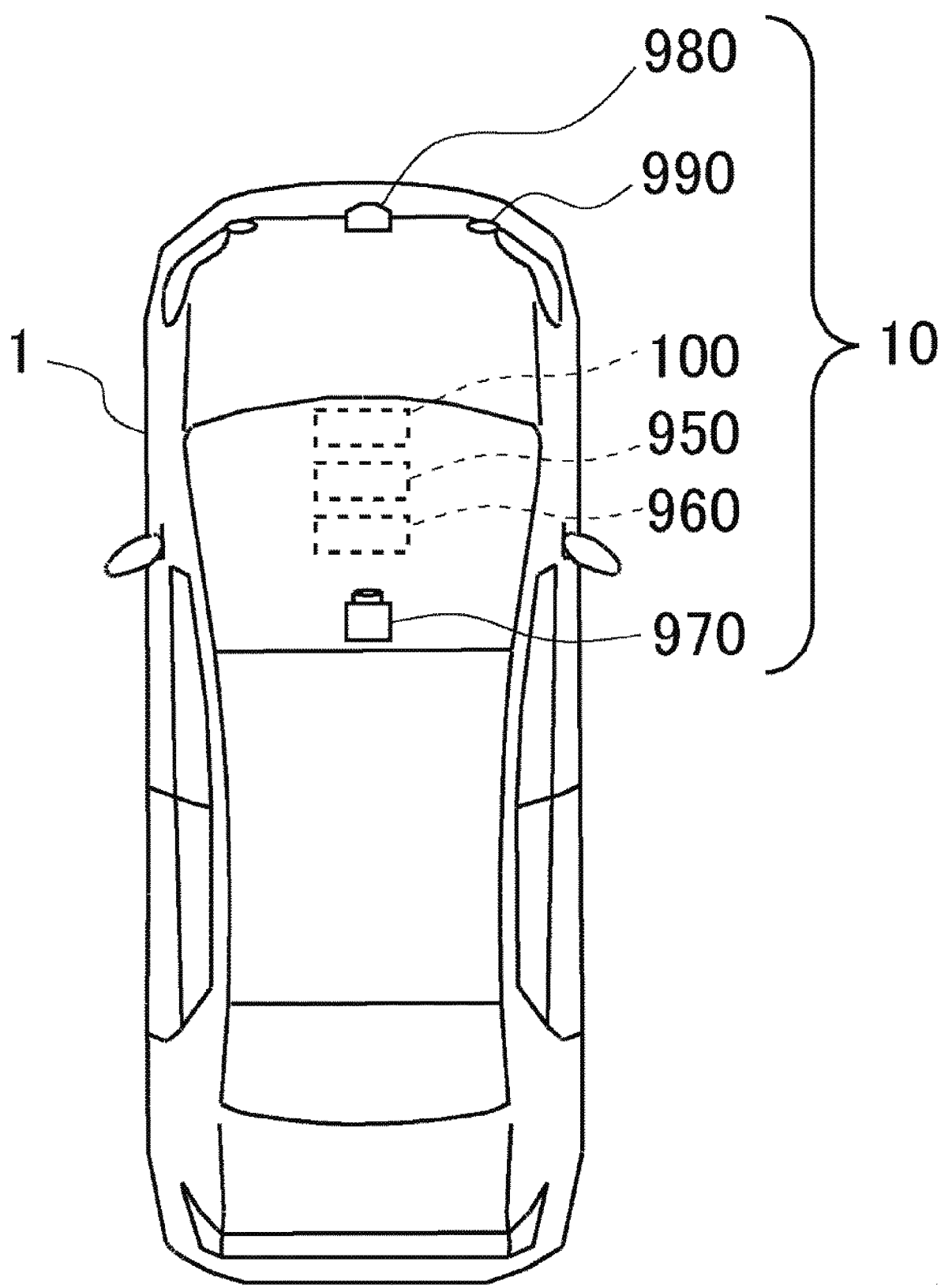
FIG. 1 is a schematic diagram of a message image projecting system according to an embodiment 1.

For clarity of explanation, the following description and drawings have been appropriately omitted and simplified. Further, the respective elements described in the drawings as functional blocks which perform various processing can be configured by CPUs (Central Processing Units), memories or other circuits in terms of hardware, and are realized by programs loaded in memories, or the like in terms of software. Accordingly, it will be understood by those skilled in the art that these functional blocks can be realized in various forms by only hardware, only software or combination thereof. They are not limited to any of them. Accordingly, in the following description, a configuration exemplified as a circuit can be achieved by either hardware or software or both thereof. A configuration shown as a circuit to achieve a certain function can also be represented as a part of software to achieve a similar function. For example, a configuration described as a control circuit can be described as a control unit. Incidentally, in the respective drawings, the same elements are respectively denoted by the same reference numerals, and the dual description will be omitted as needed.

Further, the above-described programs are stored using various types of non-transitory computer readable mediums and can be supplied to a computer. The non-transitory computer readable mediums include various types of substantial recording mediums. Examples of the non-transitory computer readable mediums include a magnetic recording medium (e.g., flexible disk, magnetic tape, hard disk drive), an optical magnetic recording medium (e.g., optical magnetic disk), a CD-ROM (Read Only Memory) CD-R, a CD-R/W, and a semiconductor memory (e.g., mask ROM, PROM (Programmable ROM), EPROM (Erasable PROM), flash ROM, RAM (Random Access Memory)). Further, the programs may be supplied to the computer by various types of transitory computer readable mediums. Examples of the transitory computer readable mediums include an electric signal, an optical signal, and an electromagnetic wave. The transitory computer readable mediums are capable of supplying programs to the computer through a wired communication path such as an electric wire, an optical fiber or the like, or a wireless communication path.

Embodiment 1

An outline of a configuration of an embodiment 1 will be described with reference to FIG. 1. FIG. 1 is a schematic diagram of a message image projecting system according to the embodiment 1. FIG. 1 is a top view of a vehicle 1. As illustrated in FIG. 1, the message image projecting system 10 is mounted in the vehicle 1. The message image projecting system 10 is a system for projecting a message image onto a road surface or the like along an advancing direction of the vehicle 1. The message image is an image for transmitting a predetermined message to a driver of the vehicle 1 and persons around the vehicle 1. Further, the message image projecting system 10 has a function for suppressing a message image to be projected from changing under the influence of the road surface on which the message image is to be projected. That is, the message image projecting system 10 projects a reference image set in advance, captures the projected reference image, and utilizes an image signal generated by capturing to thereby adjust the brightness of the message image signal. The message image projecting system 10 has, as its main configuration, a semiconductor device 100, an external memory 950, an ECU (Electronic Control Unit) device 960, a camera 970, a reference image projecting device 980, and a message image projecting device 990.

The semiconductor device 100, the external memory 950, and the ECU device 960 are respectively mounted at predetermined positions of the vehicle 1. The details of these will be described later. The camera 970 is a device for capturing an image in the advancing direction of the vehicle 1. The camera 970 is fixed in such a manner that the advancing direction of the vehicle 1 can be imaged. The reference image projecting device 980 is a device for projecting a preset reference image in the advancing direction of the vehicle 1. The reference image projecting device 980 is fixed to the front surface of the vehicle 1. The message image projecting device 990 is a device for projecting a preset message image in the advancing direction of the vehicle 1. The message image projecting device 990 is fixed to the front surface of the vehicle 1.

Incidentally, the reference image is an image including a signal to be referred to for adjusting a message image signal being a signal of the message image. The reference image is, for example, white light to be projected onto a predetermined area. The message image projecting system 10 projects such a reference image and images the projected area by the camera 970.

Figure 2:
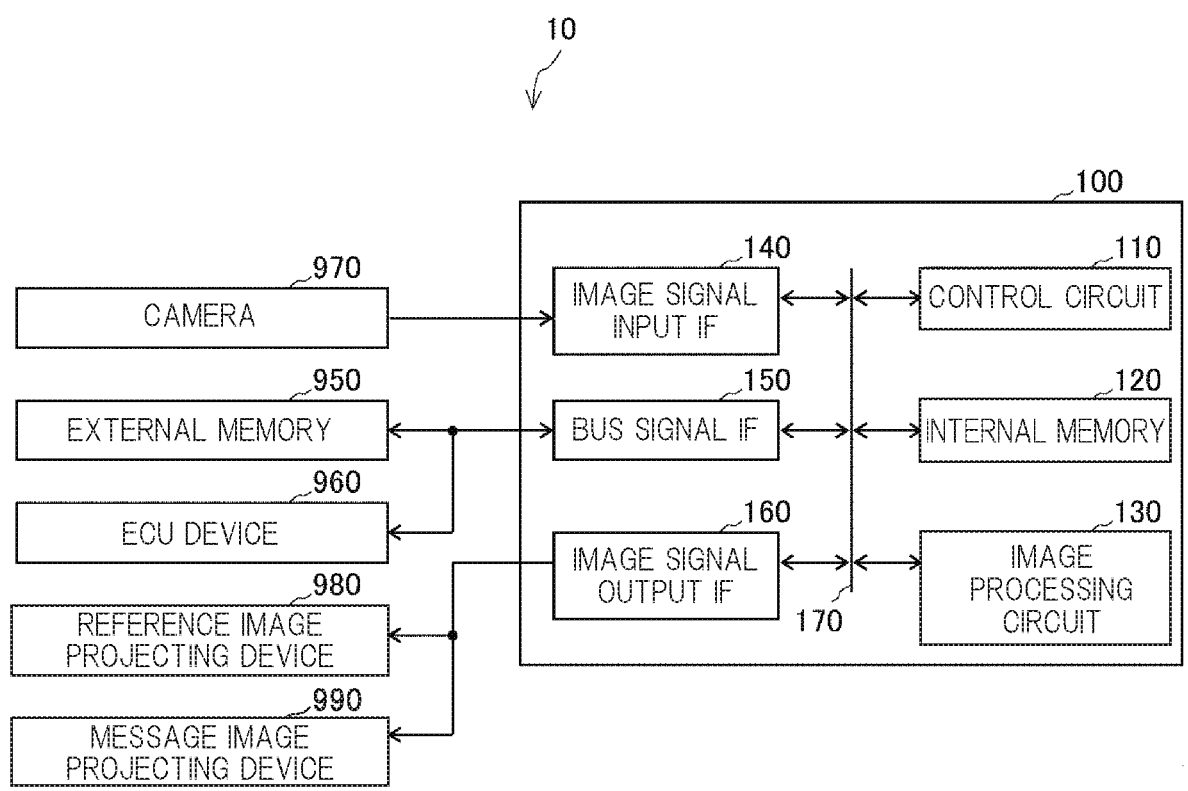
FIG. 2 is a hardware configuration diagram of the message image projecting system according to the embodiment 1.

Next, a description will be made as to functions of the respective hardware in the message image projecting system 10 and a coupling relation between the respective hardware with reference to FIG. 2. FIG. 2 is a hardware configuration diagram of the message image projecting system according to the embodiment 1.

The semiconductor device 100 has a function of coupling to the respective configurations of the message image projecting system 10 and appropriately controlling these. The semiconductor device 100 has, as its internal configurations, a control circuit 110, an internal memory 120, an image processing circuit 130, an image signal input IF 140, a bus signal IF 150, and an image signal output IF 160. These are coupled to each other by a bus 170.

The control circuit 110 is an operation device including a CPU and executes a predetermined program and transmits various instructions to the respective configurations included in the semiconductor device 100.

The internal memory 120 is a memory unit which stores predetermined data therein. The internal memory 120 is configured by a nonvolatile memory like an SSD (Solid State Drive) or a flash memory, or a volatile memory like a DRAM (Dynamic Random Access Memory) or an SRAM (Static Random Access Memory), or a combination of these.

The image processing circuit 130 has a function of performing preset processing on a signal of an image received through the bus 170 and outputting the signal subjected to the processing. The details of the function of the image processing circuit 130 will be described later.

The image signal input IF 140 is an interface which receives an image signal from the outside of the semiconductor device 100. The image signal input IF 140 is coupled to the camera 970. The image signal input IF 140 receives an image signal generated by the camera 970 and supplies the received image signal to the image processing circuit 130 through the bus 170.

The bus signal IF 150 is an interface for allowing the semiconductor device 100 to transmit and receive various signals to and from devices outside the semiconductor device 100 through the bus 170. More specifically, the bus signal IF 150 receives a predetermined message image signal from the external memory 950 and supplies the received image signal to the image processing circuit 130 through the bus 170. Also, the bus signal IF 150 receives data regarding operation of the vehicle 1 from the ECU device and transmits the received data to the internal memory 120 or the image processing circuit 130 or the like through the bus 170. Further, the bus signal IF 150 receives a predetermined signal from the control circuit 110 and the image processing circuit 130 and supplies the received signal to the external memory 950 or the ECU device 960.

The image signal output IF 160 is an interface for supplying an image signal to the devices outside the semiconductor device 100. The image signal output IF 160 is coupled to the reference image projecting device 980 and the message image projecting device 990 respectively. The image signal output IF 160 receives an image signal from the image processing circuit 130 and supplies the received image signal to the reference image projecting device 980 or the message image projecting device 990 appropriately.

The external memory 950 is a memory unit which is coupled to the bus signal IF 150 of the semiconductor device 100 and performs transmission and reception of various signals to and from the semiconductor device 100. The external memory 950 is, for example, a nonvolatile memory unit such as a flash memory, an SSD or an HDD (Hard Disc Drive). The external memory 950 stores a predetermined message image signal therein in advance. The external memory 950 receives a request signal from the semiconductor device 100 and supplies the pre-stored message image signal to the semiconductor device 100 according to the received request signal.

The ECU device 960 is a device which manages or controls various information concerning the operation of the vehicle, such as the moving speed of the vehicle 1, the steering angle of a steering, self-vehicle position information from the GPS (Global Positioning System), etc. The ECU device 960 is coupled communicably inside the vehicle 1 by an in-vehicle communication bus such as in-vehicle Ethernet (registered trademark), a CAN (Controller Area Network), or a LIN (Local Interconnect Network) or the like. The ECU device 960 supplies movement information being information about the movement of the vehicle 1 to the bus signal IF 150 of the semiconductor device 100. The movement information includes the moving speed of the vehicle 1, the steering angle, and times at which these information are acquired. Further, the movement information may include the position information from the GPS.

The camera 970 receives an instruction from the semiconductor device 100 and performs imaging according to the received instruction. The camera 970 supplies an image signal generated by imaging to the image signal input IF 140 of the semiconductor device 100.

The reference image projecting device 980 is a projecting device for projecting a predetermined reference image. The reference image projecting device 980 is configured of a light source which irradiates light for projection, a display device which generates a reference image to be projected, and a lens for projecting the generated image onto a desired position, etc. The reference image projecting device 980 is coupled to the image signal output IF 160 of the semiconductor device 100. The reference image projecting device 980 receives a reference image signal from the image signal output IF 160 and projects a reference image corresponding to the received reference image signal. Incidentally, when the reference image signal is of a single color, the reference image projecting device 980 requires no display device. In this case, the reference image projecting device 980 may be one to project light high in directivity onto a desired position. Further, the reference image projecting device 980 may have a movable part for changing a projection area for the reference image in order to control the projection area for the reference image to be projected.

The message image projecting device 990 is a projecting device for projecting a predetermined message image. The message image projecting device 990 is configured of a light source which irradiates light for projection, a display device which generates a message image to be projected, and a lens for projecting the generated image onto a desired position, etc. The message image projecting device 990 is coupled to the image signal output IF 160 of the semiconductor device 100. The message image projecting device 990 receives a message image signal from the image signal output IF 160 and projects a message image corresponding to the received message image signal. Incidentally, the message image projecting device 990 may have a movable part to project the message image onto a desired position.

Figure 3:
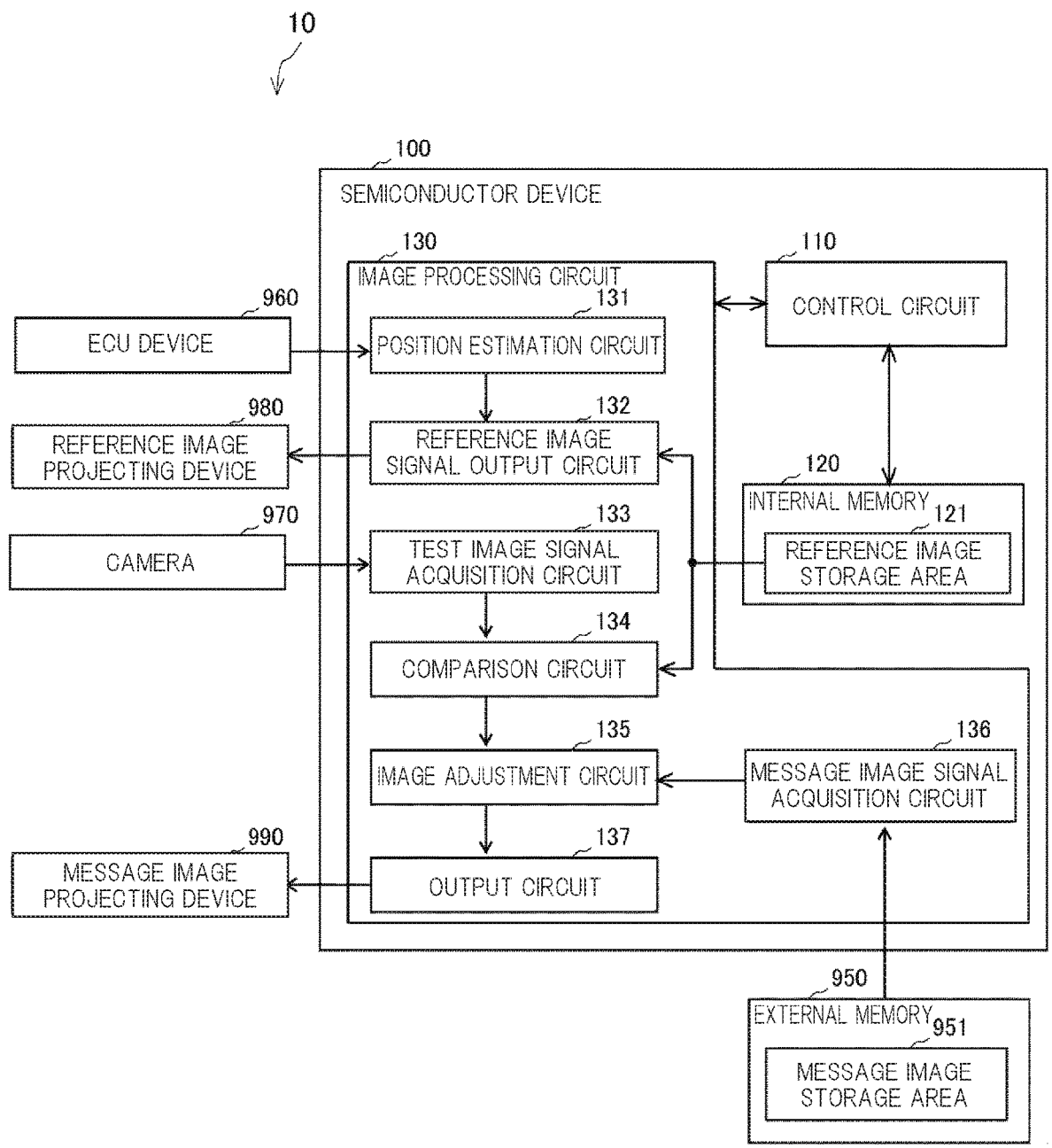
FIG. 3 is a functional block diagram of the message image projecting system according to the embodiment 1.

Next, the function of the message image projecting system 10 and the flow of each signal will further be described with reference to FIG. 3. FIG. 3 is a functional block diagram of the message image projecting system according to the embodiment 1.

The internal memory 120 of the semiconductor device 100 has a reference image storage area 121. The reference image storage area 121 stores a reference image signal therein. The reference image signal may be one stored in the reference image storage area 121 in advance. The reference image signal may be one read from the external memory 950 after starting the system. The reference image signal is supplied to the image processing circuit 130 according to an instruction from the control circuit 110.

The image processing circuit 130 has a position estimation circuit 131, a reference image signal output circuit 132, a test image signal acquisition circuit 133, a comparison circuit 134, an image adjustment circuit 135, a message image signal acquisition circuit 136, and an output circuit 137. Each functional block included in the image processing circuit 130 will be described below.

The position estimation circuit 131 bears a function of calculating an estimation position of the vehicle 1 at a scheduled time to project a message image, on the basis of movement information of the vehicle 1. The position estimation circuit 131 receives the movement information of the vehicle 1 from the ECU device 960. Further, the position estimation circuit 131 receives information concerning the scheduled time to project the message image from the control circuit 110. Then, the position estimation circuit 131 estimates the position of the vehicle 1 at the scheduled time to project the message image. The position estimation circuit 131 supplies information about the estimated position of vehicle 1 to the reference image signal output circuit 132.

Figure 4:
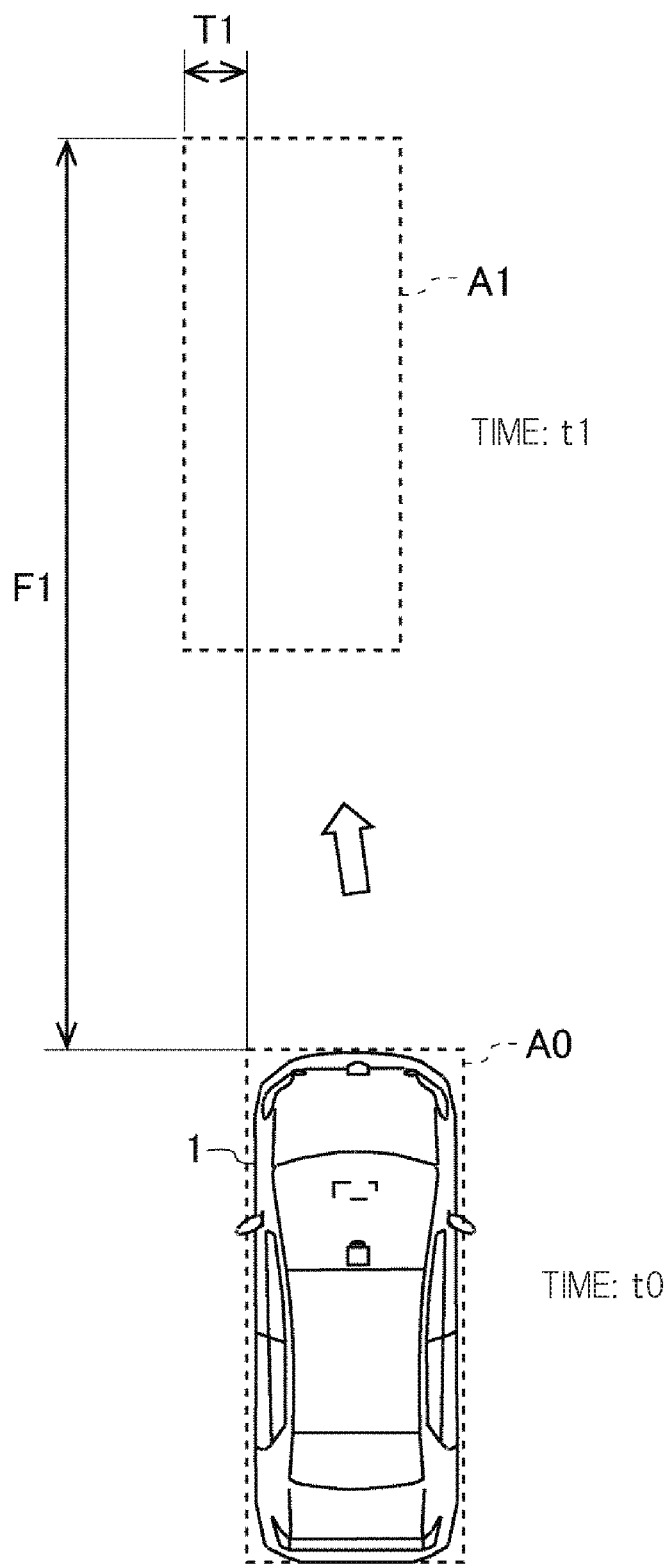
FIG. 4 is a diagram for describing self-vehicle position estimation conducted by the message image projecting system.

The function of the position estimation circuit 131 will be specifically described with reference to FIG. 4. FIG. 4 is a diagram for describing self-vehicle position estimation conducted by the message image projecting system. FIG. 4 shows that the vehicle 1 exists in a position A0 at a time t0. Here, a scheduled time to project a message image is assumed to be a time t1. In this case, the position estimation circuit 131 estimates the position of the vehicle 1 at the time t1 on the basis of movement information of the vehicle 1 at the time t0. In FIG. 4, the position A1 of the vehicle 1 at the time t1 is a place separated by a distance F1 forward from the position A0 and shifted by a distance T1 to the left side. Thus, the position estimation circuit 131 estimates that the vehicle 1 is moved to the position A1 at the time t1.

Referring back to FIG. 3, the description will be continued. The reference image signal output circuit 132 decides a reference area being an area to project a preset reference image on the basis of a relative positional relation between a mobile at an estimation position and a projection area. Further, the reference image signal output circuit 132 receives the reference image signal from the internal memory 120. Then, the reference image signal output circuit 132 outputs the reference image signal being a signal of a reference image corresponding to the reference area to the reference image projecting device 980.

Figure 5:
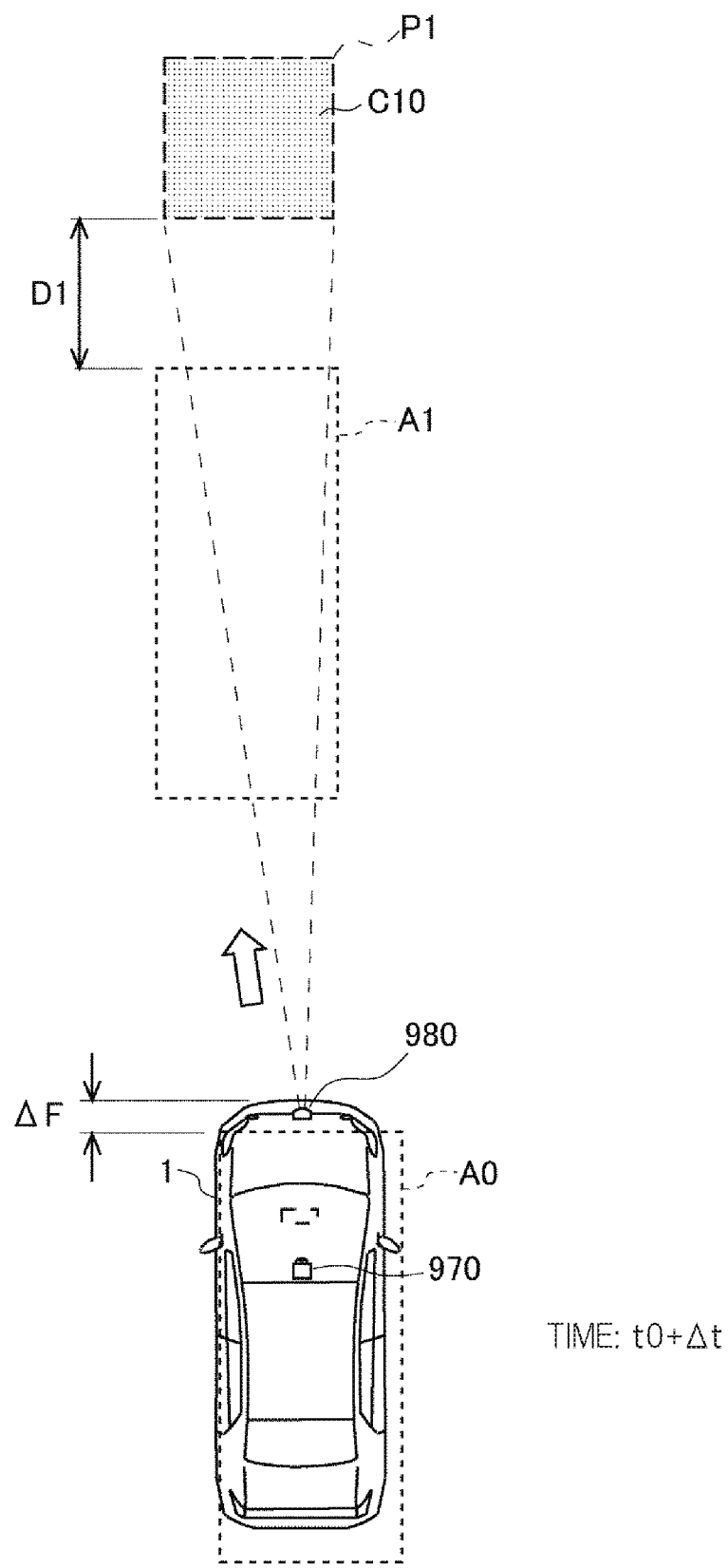
FIG. 5 is a diagram for describing reference image projection conducted by the message image projecting system.

The function of the reference image signal output circuit 132 will be specifically described with reference to FIG. 5. FIG. 5 is a diagram for describing reference image projection conducted by the message image projecting system. FIG. 5 shows a state in which the reference image projecting device 980 projects a reference image C10 onto a position P1 being a projection area. When the reference image signal output circuit 132 receives information concerning the position A1 of the vehicle 1 at the scheduled time t1 from the position estimation circuit 131, the reference image signal output circuit 132 calculates a projection area of a message image at the position A1. Here, the projection area of the message image is assumed to be a position of a distance D1 present ahead of the vehicle 1. The reference image signal output circuit 132 projects the reference image C10 onto the position P1 of the distance D1 ahead of the position A1.

Meanwhile, in FIG. 5, the vehicle 1 is moved by a distance ΔF forward from the position A0. This is because a time Δt elapses from the time when the reference image signal output circuit 132 receives the information about the estimation position of the vehicle 1 from the position estimation circuit 131 to the projection of the reference image. The reference image signal output circuit 132 outputs a reference image signal after taking the time required for the processing in this manner into account. Incidentally, for example, a time of about several tens of milliseconds is taken to project the reference image by the reference image projecting device 980. Accordingly, the reference image projecting device 980 does not need to perform processing such as the reference image being projected by the reference image projecting device 980 while changing a relative position of the reference image.

Referring back to FIG. 3, the description will be continued. The test image signal acquisition circuit 133 bears a function of acquiring a test image signal being a signal of an image obtained by imaging the reference area on which the reference image is projected. That is, the camera 970 captures the image including the reference image as the reference image projecting device 980 projects the reference image. The camera 970 supplies the test image signal being the signal of the image subjected to the capturing to the test image signal acquisition circuit 133.

Figure 6:
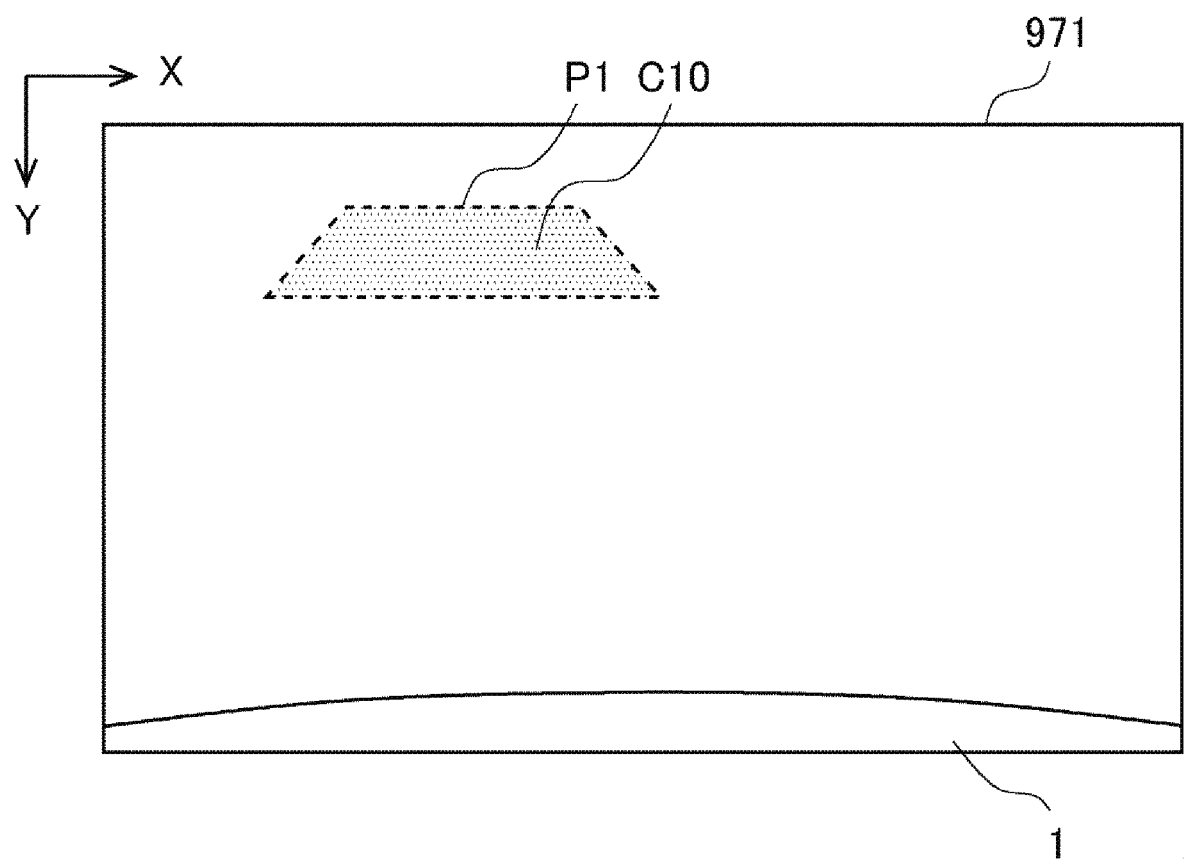
FIG. 6 is a diagram showing an example of a test image captured by a camera.

A test image acquired by the test image signal acquisition circuit 133 will be described with reference to FIG. 6. FIG. 6 is a diagram showing an example of a test image captured by the camera. FIG. 6 is an image 971 captured by the camera 970. The image 971 includes a reference image C10 at a position P1 ahead of the vehicle 1. The test image signal acquisition circuit 133 acquires a test image signal being a signal of the reference image C10 at the position P1 from the image 971. When acquiring the test image signal, the test image signal acquisition circuit 133 may receive information about the position where the reference image is projected, from the reference image signal output circuit 132. The reference image signal output circuit 132 and the test image signal acquisition circuit 133 set, for example, an X coordinate in the horizontal direction and a Y coordinate in the vertical direction with the upper left corner of the image 971 as the original point, and share the position of the reference image by an XY coordinate system. More specifically, for example, processing to be shown below is performed. That is, the test image signal acquisition circuit 133 detects a display pixel position of the reference image within the test image, extracts a detected area, and performs geometric conversion such as trapezoidal correction or the like thereon in such a manner that the extracted area becomes a rectangle. Thus, the test image signal acquisition circuit 133 extracts an area (position P1) onto which the reference image has been projected, from the test image signal received from the camera 970 and sets the reference image and the test image in such a manner that they assume the same rectangular size and are comparable at 1:1 as a pixel unit.

Refer back to FIG. 3. The comparison circuit 134 bears a function of comparing the reference image signal with the test image signal. That is, the comparison circuit 134 receives the reference image signal from the internal memory 120 and receives the test image signal from the test image signal acquisition circuit 133. Here, the comparison circuit 134 compares a brightness value of each color of the reference image signal and a brightness value of each color of the test image signal. At this time, the brightness value of each color of the test image signal may be an average value of brightness values of respective colors in the area of the position P1 included in the image 971 or may be a central value thereof. Further, the comparison circuit 134 may make an aspect ratio of the test image signal at the position P1 and an aspect ratio of the reference image signal correspond to each other and compare them for each pixel. The details of such comparison processing for each pixel will be described later as a modification 1. The comparison circuit 134 supplies a comparison result to the image adjustment circuit 135.

The message image signal acquisition circuit 136 receives a message image signal from a message image storage area 951 of the external memory 950 and supplies the received message image signal to the image adjustment circuit 135.

The image adjustment circuit 135 receives the message image signal from the message image signal acquisition circuit 136. Further, the image adjustment circuit 135 receives the comparison result from the comparison circuit 134 and adjusts the message image signal on the basis of the received comparison result. The image adjustment circuit 135 performs such an adjustment of a brightness value of each color on each pixel of the message image signal. In other words, the image adjustment circuit 135 adjusts a pixel value of the message image signal.

When the image adjustment circuit 135 adjusts the message image signal, the image adjustment circuit 135 supplies the adjusted message image signal to the output circuit 137. When the output circuit 137 receives the adjusted message image signal from the image adjustment circuit 135, the output circuit 137 supplies the received message image signal to the message image projecting device 990.

Figure 7:
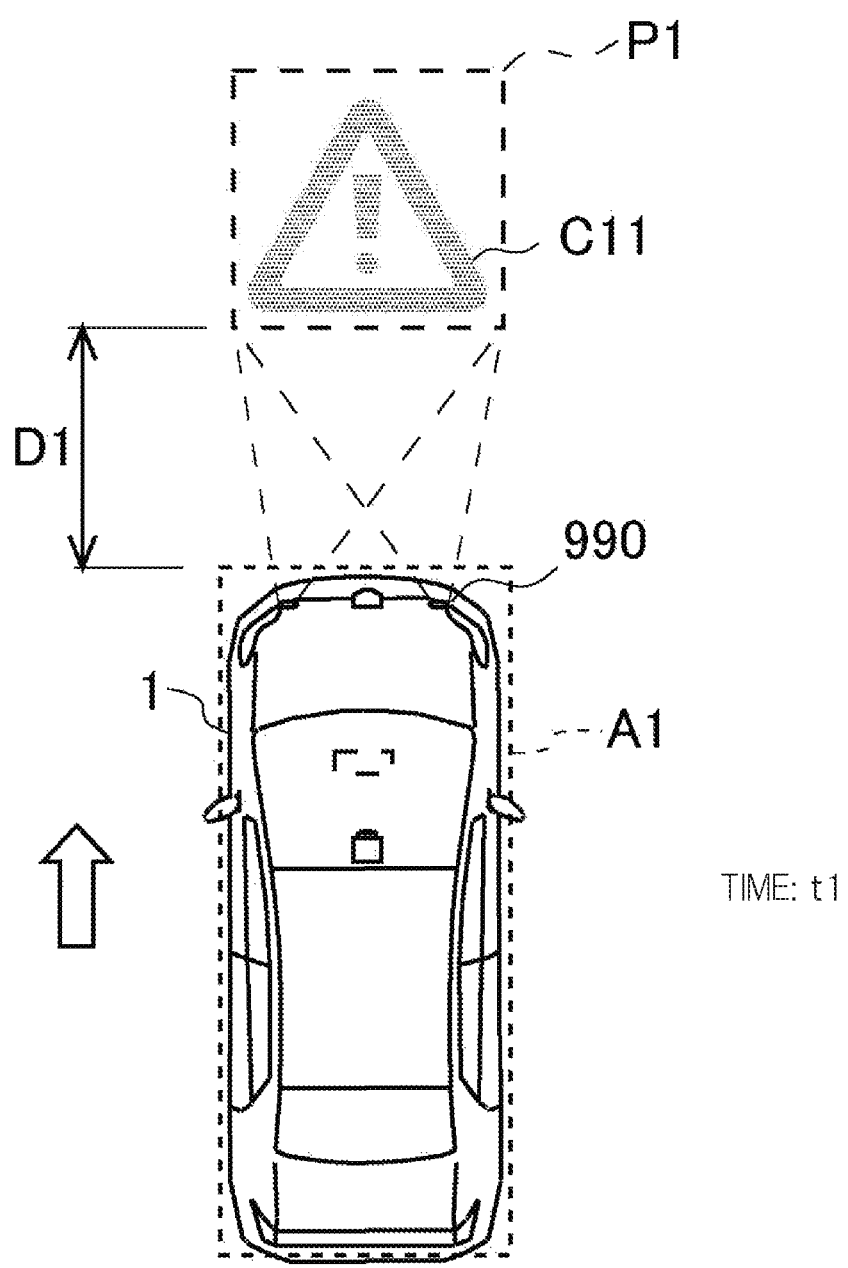
FIG. 7 is a diagram for describing a comparison of a brightness value between a reference image signal and a test image signal.

FIG. 7 is a diagram of a state in which the message image projecting system projects a message image. As shown in FIG. 7, the vehicle 1 is moved to a position A1 at a time t1. Then, the message image projecting device 990 projects a message image C11 onto a position P1 of a distance D1 ahead of the vehicle 1. As described above, the message image projecting system 10 projects in advance, the reference image onto the position to project the message image and captures the projected reference image. Then, the message image projecting system 10 adjusts the message image signal by utilizing the test image signal obtained from the captured image and projects the adjusted message image signal.

Figure 8:
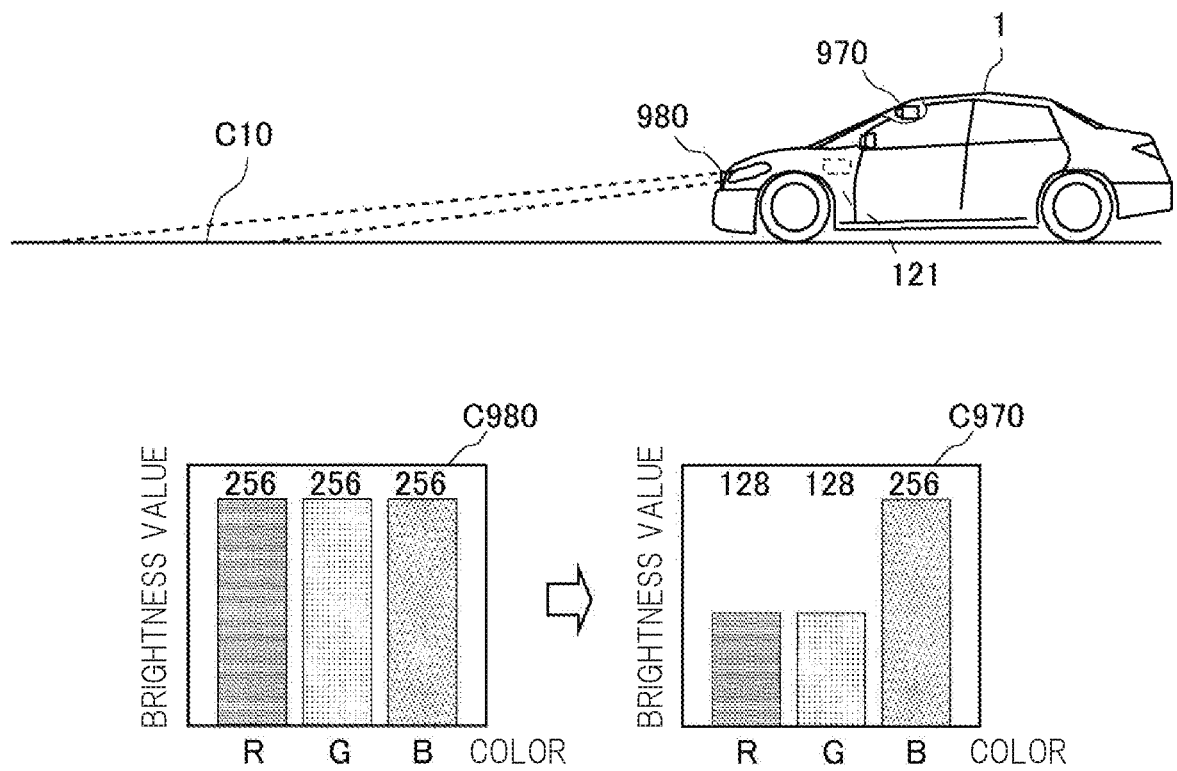
FIG. 8 is a diagram for describing the principle of adjusting a brightness value of a message image signal.

Next, a description will be made as to an example of the adjustment of the message image signal, which is conducted by the semiconductor device 100. In the present embodiment, the semiconductor device 100 adjusts the color of a message image on the basis of the reflectivity of the road surface. A comparison of a brightness value between a reference image signal and a test image signal will first be described with reference to FIG. 8. FIG. 8 is a diagram for describing the comparison of the brightness value between the reference image signal and the test image signal. The upper side of FIG. 8 shows the side surface of the vehicle 1 which projects the reference image C10 while running. The vehicle 1 projects a reference image C10 onto the road surface through the reference image projecting device 980. Then, the camera 970 captures the projected reference image C10.

A table C980 and a table C970 are shown on the lower side of FIG. 8. The table C980 is the brightness values of the reference image signal. The table C980 indicates red (R signal), green (G signal), and blue (B signal) in the horizontal axis, and indicates a brightness value in the vertical axis. That is, the reference image signal stored in the reference image storage area 121 is a white signal in which all of the R, G and B signals are 256. The reference image projecting device 980 projects a white reference image C10.

The table C970 is the brightness values of the test image signal. The camera 970 captures a reference image and acquires a test image signal from the captured image. As the brightness value of each color included in the test image signal, the brightness value of the R signal is 128, the brightness value of the G signal is 128, and the brightness value of the B signal is 256. As shown in the drawing, they are not the same as those in the reference image signal. That is, the reference image projected onto the road surface is affected by reflectivity that the road surface has. In the test image signal, the brightness value of each color is determined depending on the reflectivity that the road surface has.

When the example of FIG. 8 is observed for each color, the brightness value of the reference image is 256 in the R signal, but the brightness value is reduced to 128 in the test image signal. That is, the reflectivity of the R signal that the road surface has is 50% (128/256). Likewise, the reflectivity of the G signal that the road surface has is also 50%, and the reflectivity of the B signal is 100%. Thus, the semiconductor device 100 calculates the difference in brightness value between the reference image signal and the test image signal and calculates the reflectivity of the road surface from the calculated difference in brightness value.

Figure 9:
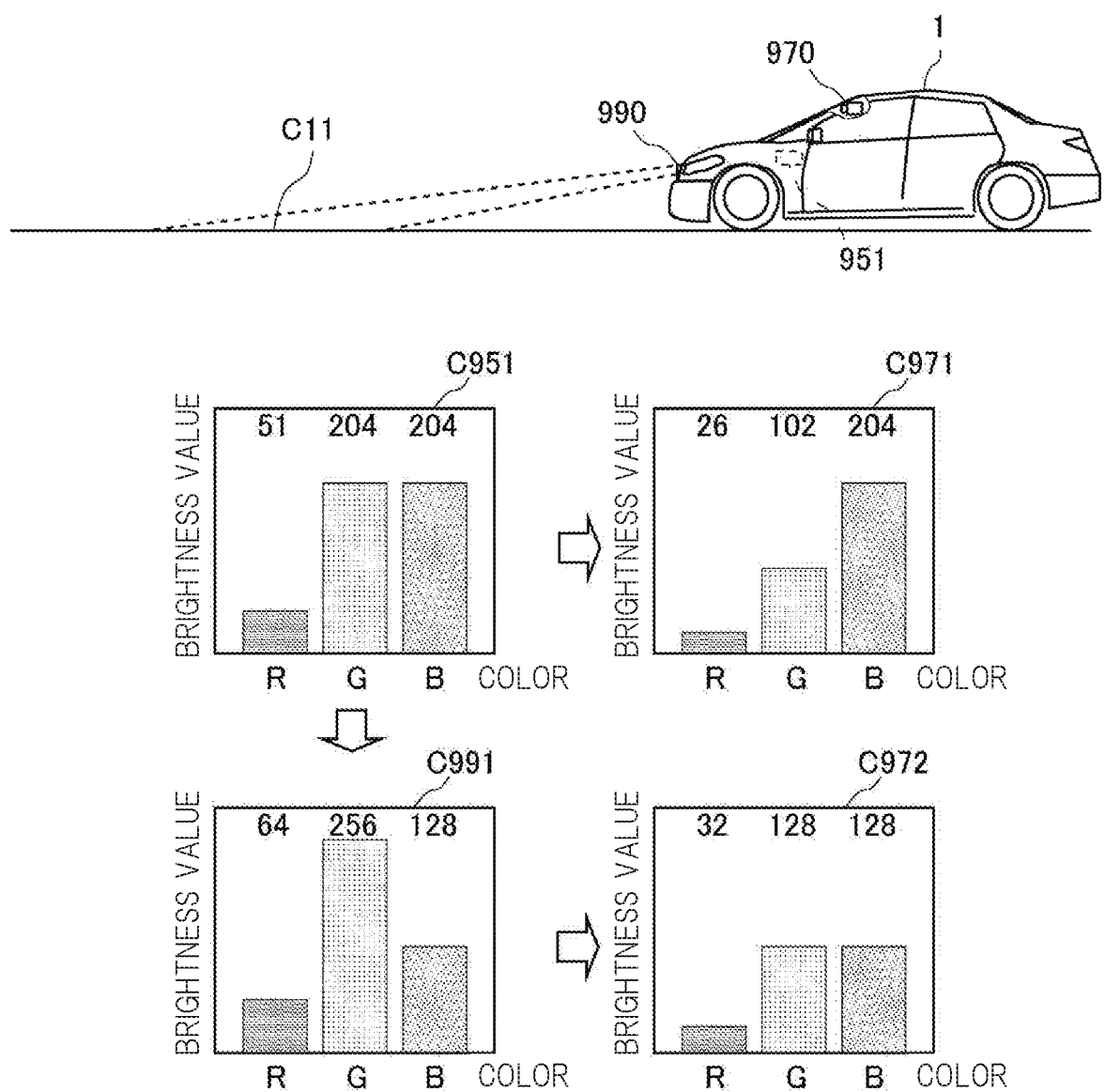
FIG. 9 is a diagram of a state in which the message image projecting system projects a message image.

A method for adjusting the message image signal will next be described with reference to FIG. 9. FIG. 9 is a diagram for describing the principle of adjusting the brightness value of the message image signal. FIG. 9 shows on it upper side, a state in which the message image projecting device 990 of the vehicle 1 being running projects a message image. FIG. 9 shows on its lower side, a table C951, a table C991, a table C971, and a table C972 as an example of image processing to be conducted by the vehicle 1 during running. The table C951 is a brightness value of each color of the message image stored in the message image storage area 951. Here, for easy understanding, the message image is assumed to be a single color, and the R signal, the G signal, and the B signal are assumed to have colors of 51, 204, and 204, respectively. Thus, the color of the message image is strong in green and blue and is expected to be visible to the naked eyes of a person as a blue-green color.

When the message image is projected onto the road surface without adjusting the brightness value, the table C971 indicates the brightness value of the message image captured by the camera 970. When the message image is captured by the camera 970 after the message image is projected onto the road surface having the reflectivity shown in FIG. 8, the brightness value of each color of the message image shown in C951 becomes the brightness value of the table C971. Specifically, the brightness value of the R signal becomes 26% being 50% of 51, the brightness value of the G signal becomes 102 being 50% of 204, and the brightness value of the B signal becomes 204 being 100% of 204. That is, the color of the message image projected onto the road surface becomes weak in green and is strongly visible to the naked eyes of the person in blue. Thus, when the brightness value of the image signal is not adjusted, the color of the message image signal is affected by the reflectivity of the road surface due to the projection of the message image onto the road surface. There is therefore a possibility that the color of the message image signal will change depending on a road surface condition.

The table C991 and the table C972 will next be described. The table C991 indicates the brightness value of each color after adjustment of the brightness value of the message image by the image adjustment circuit 135. The image adjustment circuit 135 adjusts the brightness value of the message image, based on the reflectivity of the road surface. A description will be made here as to an example in which the image adjustment circuit 135 performs adjustment for suppressing a change in the reflectivity of the road surface. The image adjustment circuit 135 multiplies the brightness value of each color of the message image by an inverse number (1/0.5=2) of the reflectivity (50%) of the road surface (R: 51×2=102, G: 204×2=408, and B: 204×1=204). Then, the values obtained by the multiplication are normalized such that the maximum becomes 256 (R: 102÷408× 25≈664, G: 408÷408×256=256, and B: 204÷408×256≈128). As a result of execution of such processing, the brightness value of each color of the message image becomes 64 in the R signal, 256 in the G signal, and 128 in the B signal. The message image projecting device 990 projects the message image signal adjusted by the image adjustment circuit 135 onto the road surface.

The table C972 indicates brightness values where the message image signal adjusted by the image adjustment circuit 135 is projected onto the road surface, and the projected message image is captured by the camera 970. As shown in the table C972, the brightness value of the message image shown in C991 changes to 32 being 50% of 64 in the R signal, changes to 128 being 50% of 256 in the G signal, and becomes 128 being 100% of 128 in the B signal. Thus, though the message image shown in C972 is changed to be dark in tone as compared with the message image shown in C972, the message image is strong in green and blue and visible to the naked eyes of the person as a blue-green color.

As described above, the semiconductor device 100 according to the embodiment 1 is capable of performing processing to adjust the brightness value of the message image and suppress degradation in visibility for the driver or the like getting in the vehicle 1. Incidentally, the present embodiment has shown the example in which the semiconductor device 100 adjusts the color of the message image signal. In the present embodiment, however, the object to be adjusted may be contrast of the message image signal. In this case, the semiconductor device 100 performs such adjustment as to suppress the degradation of a dynamic range of brightness of the message image signal. Further, the semiconductor device 100 may adjust the tone of the whole image. That is, the semiconductor device 100 may apply gamma correction to the message image signal. Also, the semiconductor device 100 may adjust the color saturation of the message image.

Further, the semiconductor device 100 may store in advance, an adjustment signal of an image for each typical pattern of the road surface and adjust the message image by the adjustment signal stored in advance. That is, the message image projecting system 10 stores in advance, several patterns of typical adjustment signals in the external memory or the internal memory. The typical adjustment signals are adjustment signals generated considering in advance reflectivity due to road surface conditions of concrete, asphalt or stone pavements, on on-snow, in fine and rainy weather, etc. for example. Then, the semiconductor device 100 compares the test image signal with the reference image signal to thereby select a pattern in which the reflectivity of the road surface during the running of the vehicle is close to any of the typical adjustment signals stored in advance. Then, the semiconductor device 100 adjusts the message image by using the adjustment signal of the selected pattern. With this configuration, the message image projecting system 10 is capable of performing processing to suppress degradation in visibility more easily and at a high processing speed.

Furthermore, the semiconductor device 100 may add processing to suppress the brightness of the message image to be projected from being changed suddenly. For example, the semiconductor device 100 calculates an average brightness value Ave (t0) of an immediately preceding projected message image signal, calculates an average brightness value Ave (t1) of a message image signal to be projected from now, calculates a weighted average of these values, and sets a gain G of a brightness value on the basis of the calculated weighted average.

$$G = W \cdot Ave(t0) + (1-W) \cdot Ave(t1) \quad (1)$$

where W is a positive real number of 1 or less. Further, the semiconductor device 100 may adjust the brightness by a moving average in addition to the weighted average. By performing such processing, the message image projecting system 10 is capable of suppressing degradation in visibility for the driver or the like and suppressing a sudden change in the brightness value.

Figure 10:
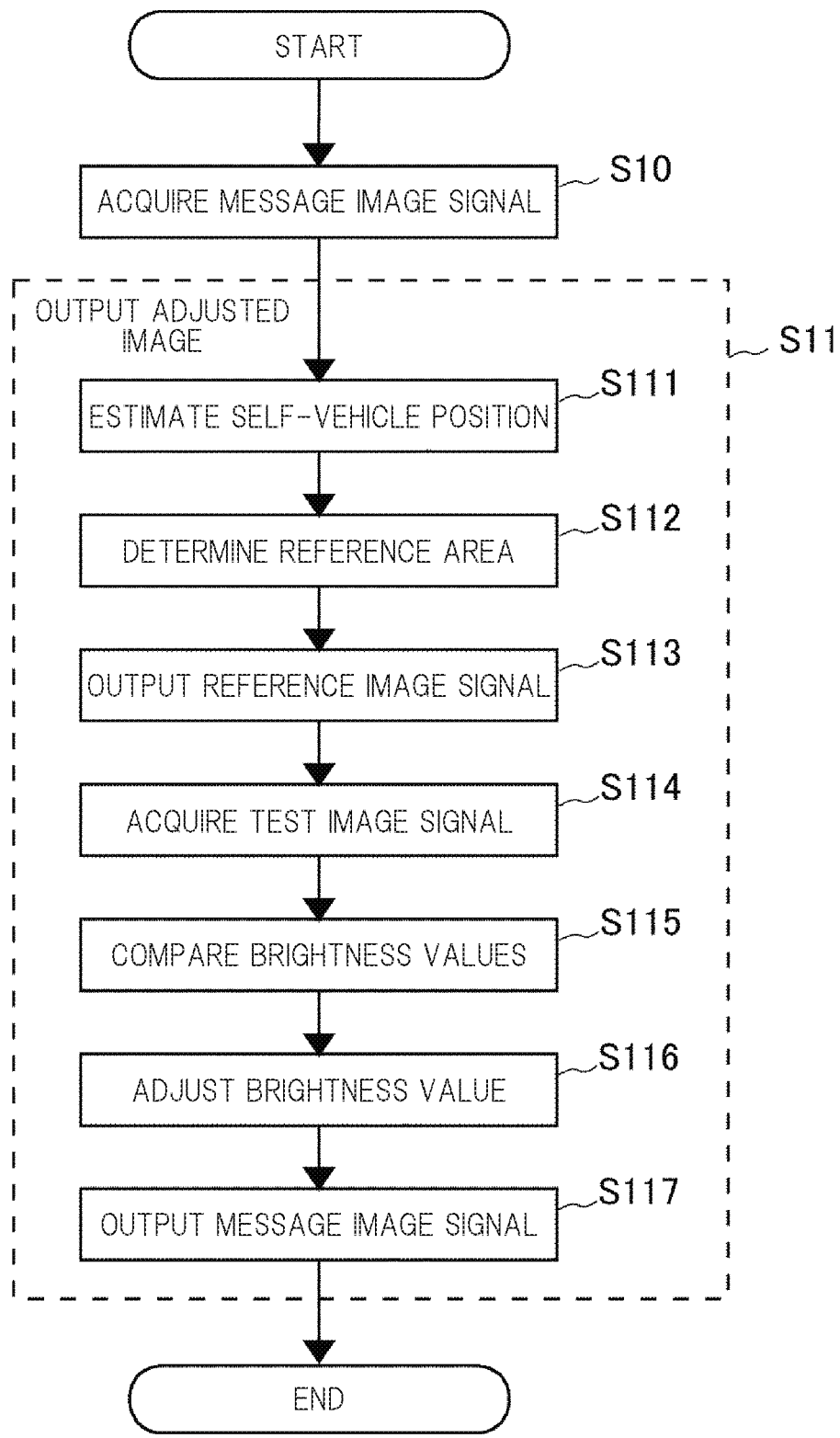
FIG. 10 is a flowchart of the message image projecting system according to the embodiment 1.

A description will next be made as to the processing to be conducted by the message image projecting system 10 with reference to FIG. 10. FIG. 10 is a flowchart of the message image projecting system according to the embodiment 1. FIG. 10 shows processing of the semiconductor device 100.

First, the semiconductor device 100 acquires a message image signal from the external memory 950 (Step S10). Next, the semiconductor device 100 adjusts the acquired message image signal and outputs the adjusted message image signal (Step S11). Step S11 will hereinafter be described in detail.

The semiconductor device 100 estimates a self-vehicle position (Step S111). That is, the semiconductor device 100 receives movement information from the ECU device 960 and estimates the position of the vehicle 1 at a schedule time when the message image is projected, on the basis of the received movement information.

Next, the semiconductor device 100 decides a reference area to project a reference image (Step S112). Further, the semiconductor device 100 outputs a reference image signal to be projected onto the reference area to the reference image projecting device 980 (Step S113).

Next, the semiconductor device 100 acquires a test image signal from the camera 970 (Step S114). Then, the semiconductor device 100 compares a brightness value of the reference image signal and that of the test image signal (Step S115). Also, the semiconductor device 100 adjusts the brightness value of each color of the message image on the basis of the result of its comparison (Step S116). Further, the semiconductor device 100 outputs the message image adjusted in the brightness value to the message image projecting device 990 (Step S117).

In the message image projecting system 10, the semiconductor device 100 executes the processing described above. Incidentally, in the flowchart of FIG. 10, the step of acquiring the message image signal may be performed at any timing as long as it is before Step S116.

As described above, the message image projecting system 10 according to the embodiment 1 adjusts the brightness value of each color of the message image according to the reflectivity of the road surface. Thus, the message image projecting system 10 is capable of projecting the message image in which the change in color due to the influence of the road surface is suppressed.

Incidentally, in the semiconductor device 100, when the reference area is decided, the reference image signal output circuit 132 may decide the time to project the reference image instead of the reference area or in addition to the reference area. That is, for example, when the running speed of the vehicle 1 is relatively fast, the timing provided to project the reference image is set relatively early as compared with the case where the running speed is relatively slow. By controlling the time to project the reference image in this manner, the semiconductor device 100 is capable of more suitably deciding the reference area according to the running speed of the vehicle 1.

According to the present embodiment as described above, it is possible to provide a semiconductor device or the like which suppresses deterioration in the image due to being affected by the projection surface.

Modification 1 of Embodiment 1

Figure 11:
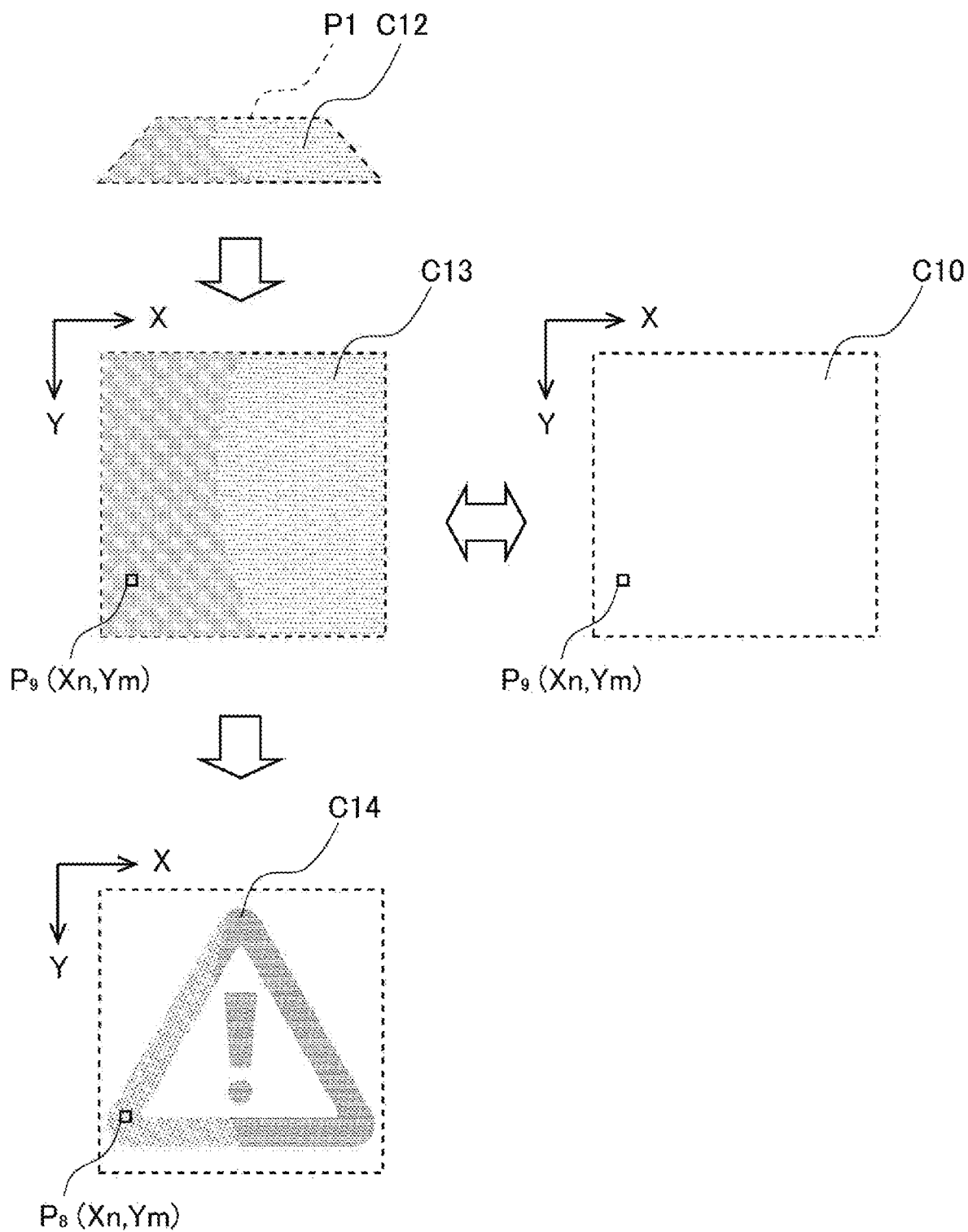
FIG. 11 is a diagram for describing a method for adjusting a message image according to a modification 1 of the embodiment 1.

Next, a description will be made as to a modification 1 of the embodiment 1. The present exemplification is different from the embodiment 1 in terms of the functions of the comparison circuit 134 and the image adjustment circuit 135. FIG. 11 is a diagram for describing a method for adjusting a message image according to the modification 1 of the embodiment 1. FIG. 11 shows a reference image C10 projected onto a position P1.

In the present exemplification, the reference image C10 has reflectivity different in the right and left thereof. In such a case, when the reflectivity of the reference image is set to be uniform to adjust a message image signal, there is a risk that an area hard to see partly occurs, and a message image is not correctly recognized. Consequently, the comparison circuit 134 of the semiconductor device 100 in the present exemplification has a function of allowing an angle of view of a reference image and an angle of view of a test image to correspond to each other and comparing a reference image signal with a test image signal for each pixel. Further, the image adjustment circuit 135 of the semiconductor device 100 in the present exemplification has a function of allowing the angle of view of the test image and an angle of view of a message image to correspond to each other and adjusting the message image signal for each pixel of the message image signal.

The present exemplification will hereinafter be described specifically with reference to FIG. 11. The comparison circuit 134 in the present exemplification first acquires an image signal of a test image C12 obtained by capturing a projected reference image. Next, the comparison circuit 134 performs linear conversion processing on the test image C12. Thus, the angle of view of the test image C12 is processed to be the same as that of a reference image C10. An image C13 shown in FIG. 11 is one obtained by processing the angle of view of the test image C12 by linear conversion. Next, the comparison circuit 134 compares the reference image C10 with the image C13 for each pixel. As illustrated in FIG. 11, for example, the comparison circuit 134 compares brightness values in terms of a pixel $P_9$ being an nth and mth pixel as viewed in X and Y directions. Thus, the comparison circuit 134 compares the brightness values of all pixels for each pixel.

Next, the image adjustment circuit 135 adjusts the message image on the basis of a result of comparison conducted by the comparison circuit 134. A message image C14 shown in FIG. 11 is one adjusted based on the result of comparison conducted by the comparison circuit 134. As shown in FIG. 11, the adjusted message image C14 is adjusted in brightness for each pixel according to the reflectivity of the road surface. Thus, according to the present exemplification, it is possible to more finely suppress deterioration in the image being affected by the road surface.

Modification 2 of Embodiment 1

Figure 12:
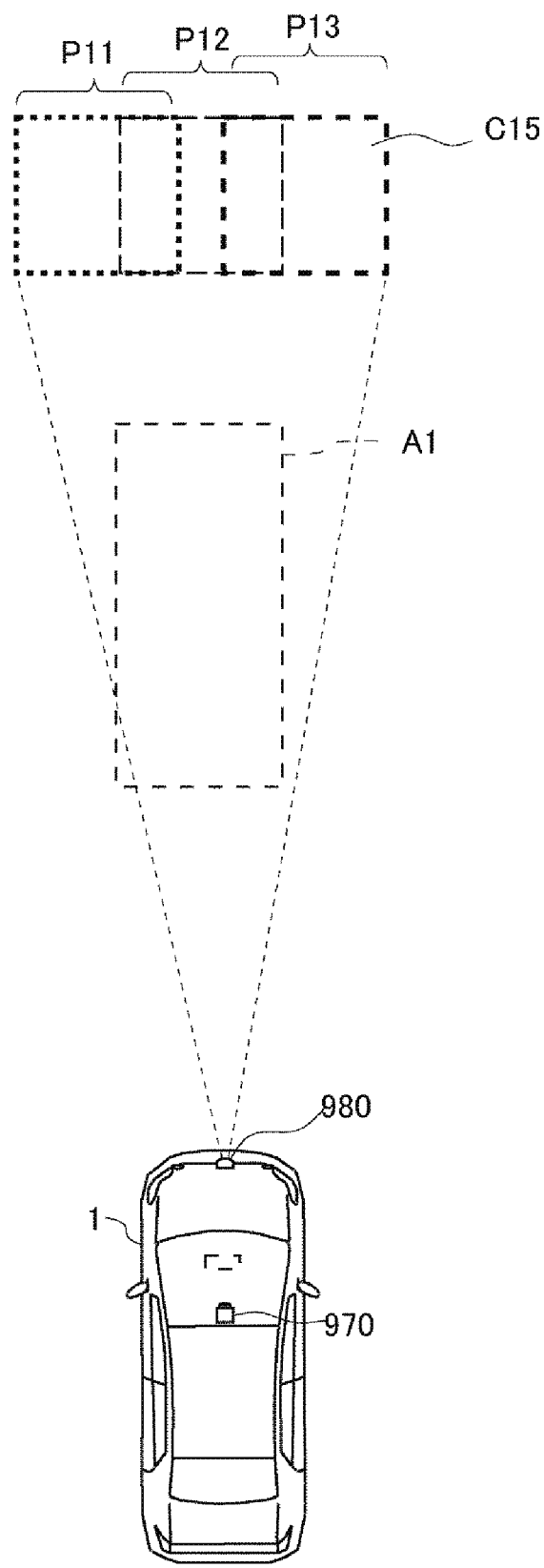
FIG. 12 is a diagram for describing a method for adjusting a message image according to a modification 2 of the embodiment 1.

A description will next be made as to a modification 2 of the embodiment 1 with reference to FIG. 12. FIG. 12 is a diagram for describing a method for adjusting a message image according to the modification 2 of the embodiment 1. A semiconductor device 100 in the present exemplification is different from the embodiment 1 in that the width of a reference image is wider than that of a message image and an optimum projection area decision part is further provided.

The reference image signal output circuit 132 outputs a reference image signal having a width larger than that of the message image. As shown in FIG. 12, a reference image C15 in the present exemplification includes reference images at positions P11 through P13. The positions P11 through P13 partly overlap in the width direction. The reference image C15 is set wider in width than the reference image C10 or the message image C11 in the embodiment 1. The reference image projecting device 980 projects the reference image C15. Then, the camera 970 captures the reference image C15 and acquires a test image signal corresponding to the reference image C15. The comparison circuit 134 generates a test image signal corresponding to each of the positions P11 through P13. Then, the comparison circuit 134 compares the test image signal at the position P11 with the reference image signal. Likewise, the comparison circuit 134 compares the test signal at the position P12 with the reference image signal and further compares the test image signal at the position P13 with the reference image signal. Thus, the optimum projection area decision part selects the position where the difference in brightness value is the smallest, on the basis of the result of comparison between the test image signal at each of P11 through P13 and the reference image signal. Then, when the vehicle 1 is moved to a position A1, the message image projecting device 990 projects a message image onto any of the positions P11 through P13, which is selected by the comparison circuit 134.

Incidentally, the positions P11 through P13 shown in the reference image C15 are an example. They may be overlapped with each other or may not need to overlap. Further, the number of positions may be two or four or more other than three.

With such a configuration, the message image projecting system 10 selects the projection area hardly affected by the road surface. That is, the message image projecting system 10 in the present embodiment is capable of projecting the message image high in visibility for the driver or the like getting in the vehicle 1. As described above, according to the present disclosure, it is possible to provide a semiconductor device or the like capable of suppressing deterioration in the image affected by the road surface. Incidentally, although the reference image projecting device 980 and the message image projecting device 990 have been described as separate devices, an integrated projecting device may be adapted to project the reference image and the message image. In this case, the projecting device is capable of projecting a reference image onto an area to project the reference image and projecting a message image onto an area to project the message image. Also, such an integrated projecting device may be one which projects a reference image at a predetermined time and projects a message image at a time different from the predetermined time. Further, such an integrated projecting device may simultaneously project a plurality of reference images respectively corresponding to message images to be projected at plural different times and then project the message images at the plural different times sequentially. Thus, when the integrated projecting device is adapted to project the reference image and the message image, it is possible to reduce the manufacturing cost of the device and achieve a weight reduction in the system.

Embodiment 2

An embodiment 2 will next be described. In a message image projecting system according to the embodiment 2, one of two vehicles while being running becomes a transmitter of a message, whereas the other thereof becomes a receiver of a message. Then, the transmitter projects a message image for the receiver. Also, the message image projecting system has a function of preventing a message image to be projected from being degraded in visibility for the receiver. Further, the message image projecting system has a function of allowing the receiver to capture a reference image projected by the transmitter when the transmitter projects a message image, and allowing the receiver to transmit an adjustment signal generated by the receiver to the transmitter.

Figure 13:
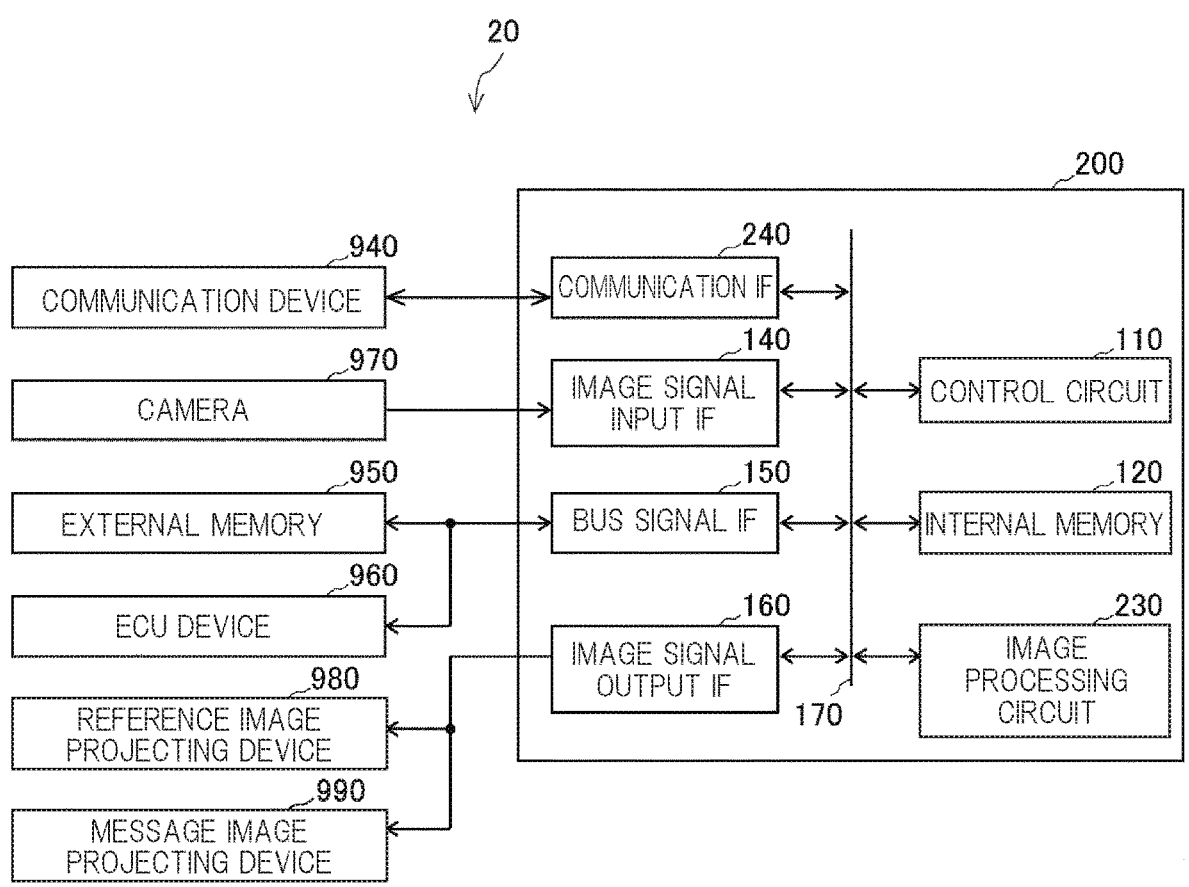
FIG. 13 is a hardware configuration diagram of a message image projecting system according to an embodiment 2.

FIG. 13 is a hardware configuration diagram of the message image projecting system according to the embodiment 2. The message image projecting system 20 according to the embodiment 2 is mainly different from the embodiment 1 in that it has a semiconductor device 200 instead of the semiconductor device 100 and further has a communication device 940.

The semiconductor device 200 is different from the semiconductor device 100 in the embodiment 1 in that it has a communication IF 240. The communication IF 240 is an interface which connects to a bus 170 in the semiconductor device 200 and connects to the communication device 940 outside the semiconductor device 200. The semiconductor device 200 performs transmission and reception of signals to and from the communication device 940 through the communication IF 240. Further, the semiconductor device 200 has an image processing circuit 230 instead of the image processing circuit 130. The image processing circuit 230 will be described later.

The communication device 940 is a communication device which performs wireless communications by using radio waves, infrared rays, or light or the like. The communication device 940 communicates directly or indirectly with its peripheral communication devices. The communication device 940 is coupled to the semiconductor device 200.

Figure 14:
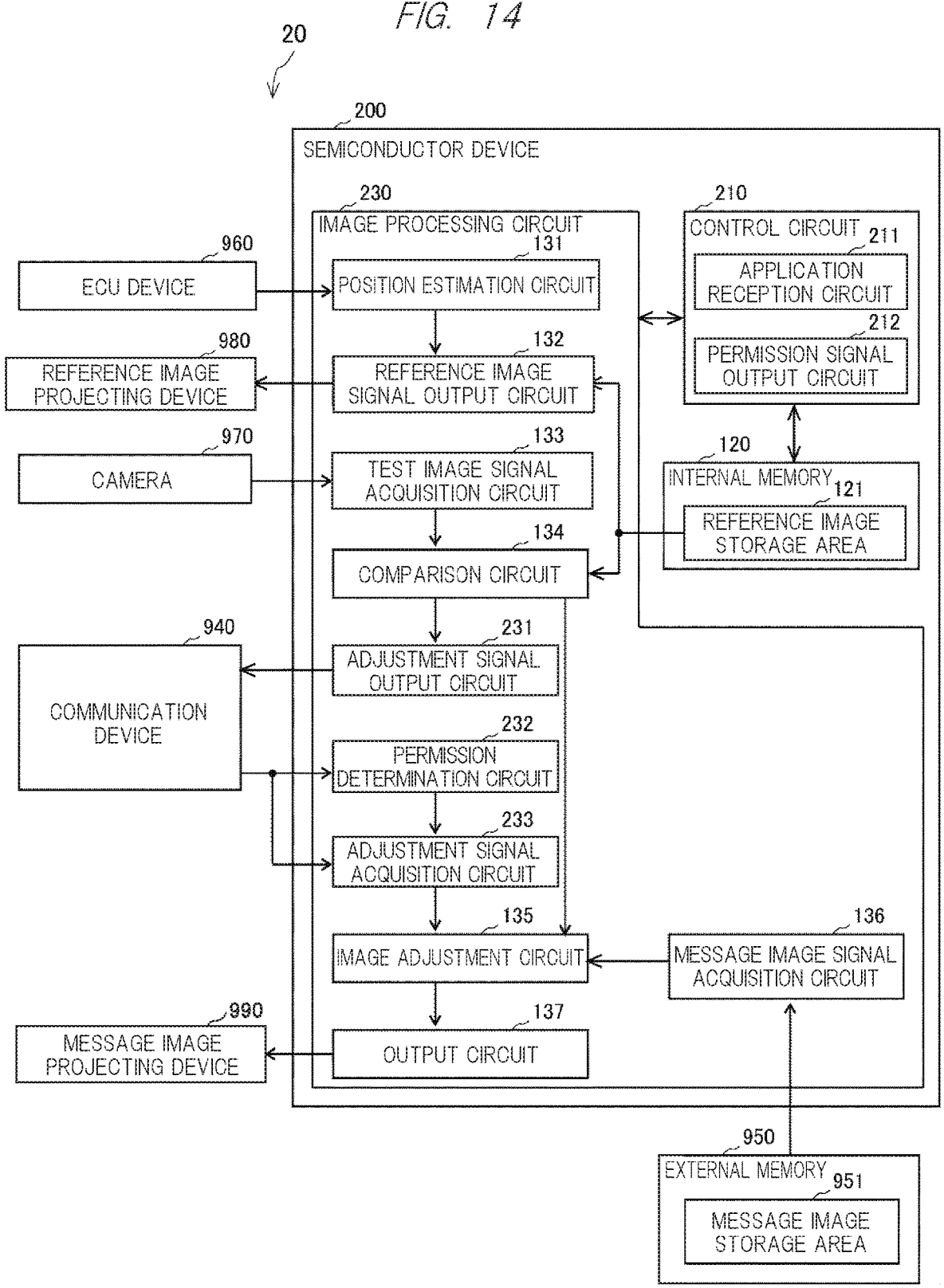
FIG. 14 is a functional block diagram of the message image projecting system according to the embodiment 2.

A description will next be made as to functional blocks of the embodiment 2 with reference to FIG. 14. FIG. 14 is a functional block diagram of the message image projecting system according to the embodiment 2. The semiconductor device 200 in the message image projecting system 20 is different from the semiconductor device 100 in that it has a control circuit 210 instead of the control circuit 110, and has the image processing circuit 230 instead of the image processing circuit 130. A description will hereinafter be made as to points of differences from the functions described in the embodiment 1.

The control circuit 210 has an application reception circuit 221 and a permission signal output circuit 212. The application reception circuit 211 accepts a coupling application signal received from another system through the communication device 940. The permission signal output circuit 212 outputs a permission signal for the coupling application signal. The permission signal output from the permission signal output circuit 212 is output to the communication device 940. The permission signal is transmitted to an opposite party for which coupling is permitted, through the communication device 940. The semiconductor device 200 performs predetermined communication with the opposite party for which the coupling has been permitted, through the application reception circuit 211 and the permission signal output circuit 212, and performs processing to image a reference signal that the opposite party projects. The details of these processing will be described later.

The image processing circuit 230 will next be described. The image processing circuit 230 is different from that in the semiconductor device 100 according to the embodiment 1 in that it has an adjustment signal output circuit 231, a permission determination circuit 232, and an adjustment signal acquisition circuit 233.

The adjustment signal output circuit 231 bears a function of receiving information about a result of comparison from a comparison circuit 134 and supplying the received information to the communication device 940. Thus, the message image projecting system 20 transmits a result of comparison between a test image signal received from a camera 970 and a reference image signal to the other party.

The permission determination circuit 232 bears a function of determining whether the permission of coupling from the other party is conducted through the communication device 940. The permission determination circuit 232 supplies a signal about a determination result to the adjustment signal acquisition circuit 233. The adjustment signal acquisition circuit 233 receives via the communication device 940, an adjustment signal corresponding to a message image signal from the other party. The adjustment signal acquisition circuit 233 supplies the received adjustment signal to the image adjustment circuit 135.

Thus, the semiconductor device 200 has the adjustment signal output circuit 231, the permission determination circuit 232, and the adjustment signal acquisition circuit 233 between the comparison circuit 134 and the image adjustment circuit 135, and these components are coupled to the communication device 940. Consequently, the semiconductor device 200 is capable of transmitting an adjustment signal concerning a reference image projected by the other party to the other party. Also, consequently, the semiconductor device 200 is capable of outputting a message image signal adjusted based on the adjustment signal generated by the other party.

Next, the respective processing to be executed by the two vehicles each having the message image projecting system 20 will be described with reference to FIGS. 15 through 18. In the processing in the present embodiment, the transmitter of a message image attempts to transmit the message image ahead of the receiver in order to enter ahead in an advancing direction in which the receiver is running.

Figure 15:
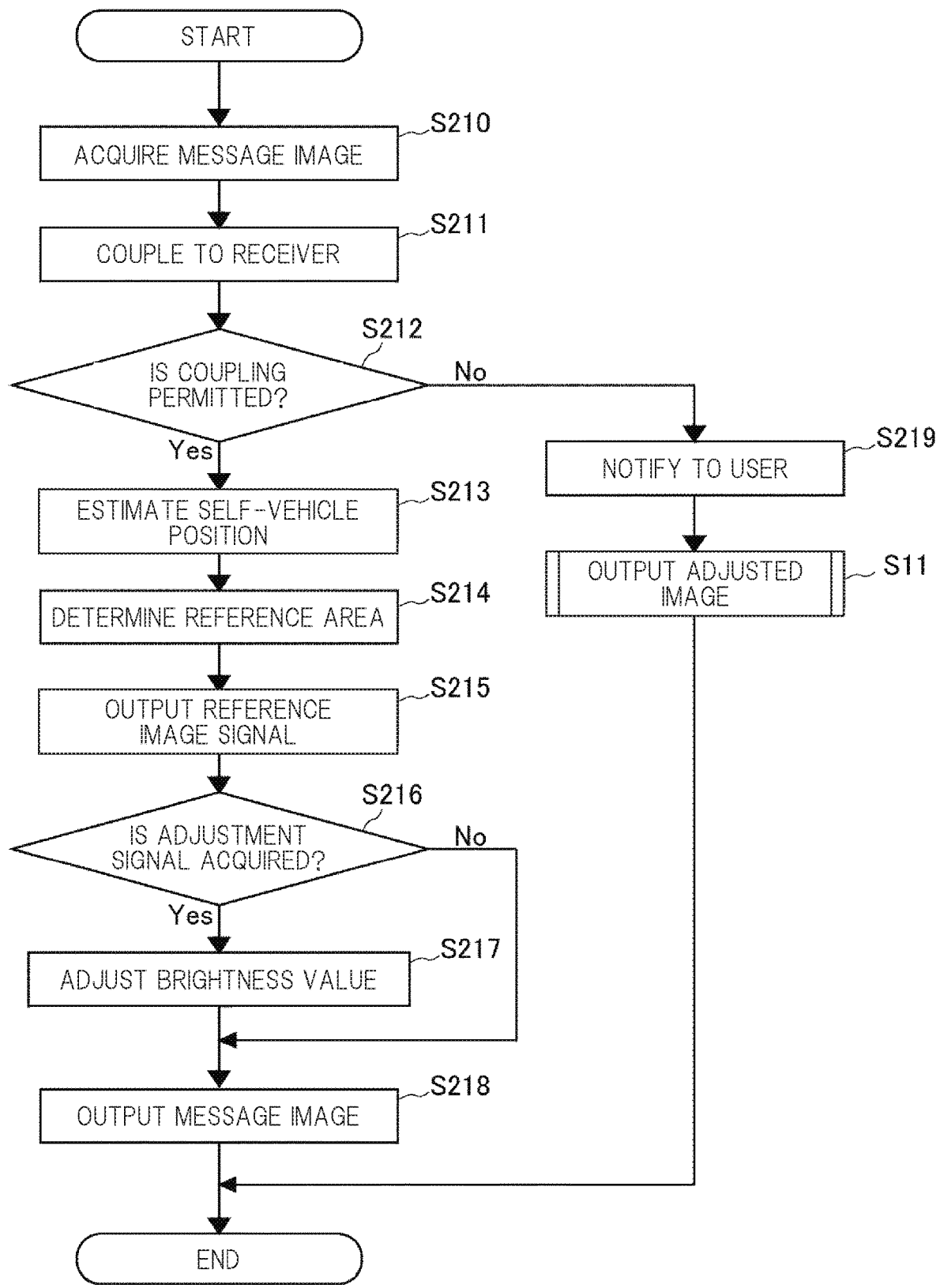
FIG. 15 is a flowchart showing processing on the message image transmitter side according to the embodiment 2.

A description will be made as to the processing of the transmitter of the message image with reference to FIG. 15. FIG. 15 is a flowchart showing the processing on the message image transmitter side according to the embodiment 2. The flowchart shown in FIG. 15 shows processing of a semiconductor device (referred to as 200S) on the message image transmitter side.

The semiconductor device 200S acquires a message image from a message image storage area 951 (Step S210). Next, the semiconductor device 200S performs coupling to the receiver of the message image (Step S211). The semiconductor device 200S determines whether the permission of coupling is received from the receiver (Step S212). When it is not determined that the coupling permission has been received from the receiver (Step S212: No), the semiconductor device 200S notifies non-reception of the coupling permission to a user (Step S219). Next, the semiconductor device 200S performs processing of projecting the message image described in FIG. 10 onto an area ahead of the transmitter itself other than ahead of the receiver (Step S11). When the processing of projecting the message image is completed, the semiconductor device 200S finishes a series of processing.

On the other hand, when it is determined that the coupling permission has been received from the receiver (Step S212: Yes), the semiconductor device 200S estimates a self-vehicle position (Step S213). Then, the semiconductor device 200S decides a reference area on the basis of the estimated self-vehicle position (Step S214). Further, the semiconductor device 200S outputs a reference image signal to the reference image projecting device 980 in order to project a reference image onto the decided reference area (Step S215).

Figure 17:
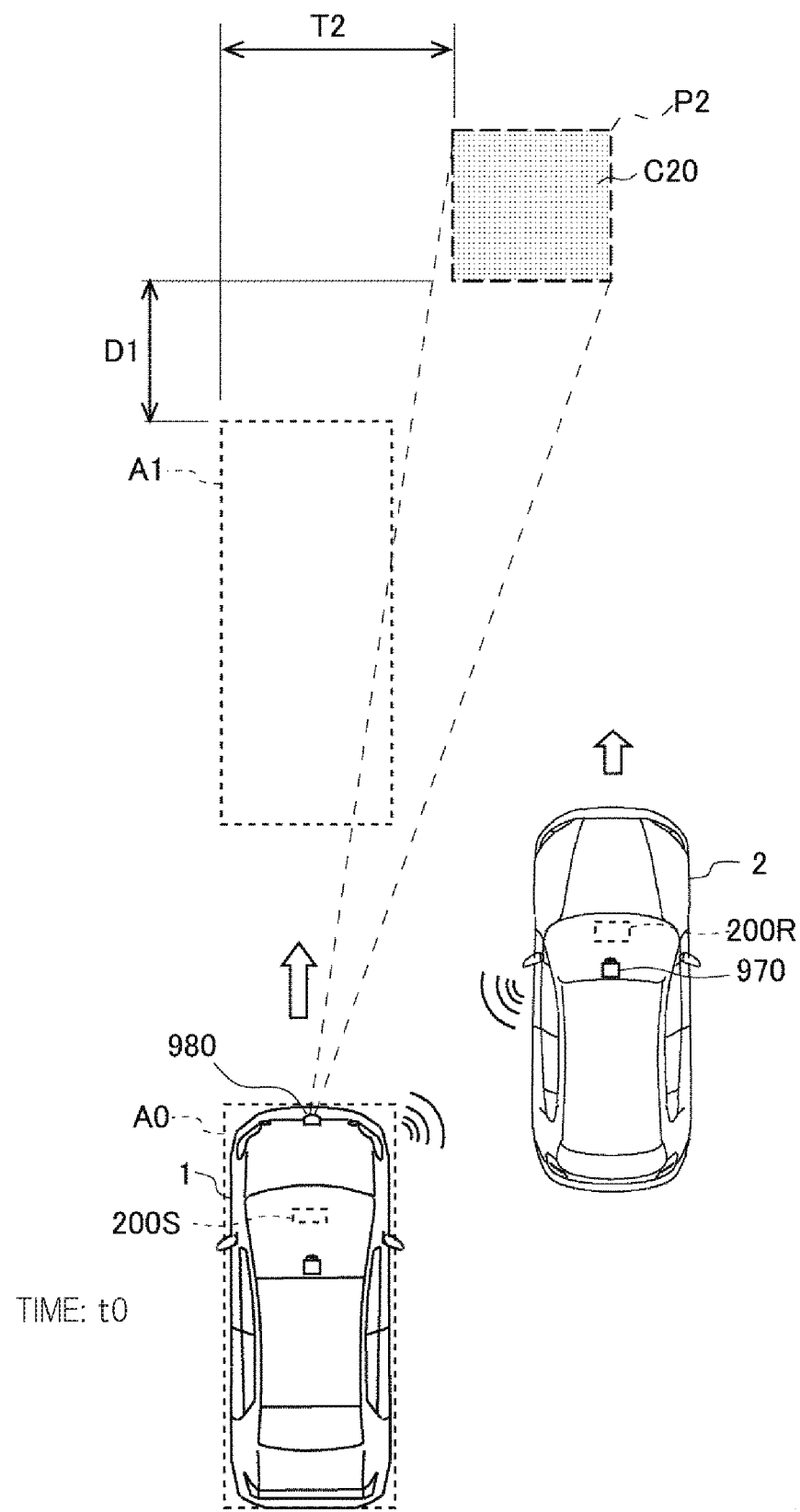
FIG. 17 is a diagram for describing self-vehicle position estimation and reference image projection conducted by the message image projecting system.

The processing of Steps S213 through S215 will be specifically described with reference to FIG. 17. FIG. 17 is a diagram for describing self-vehicle position estimation and reference image projection conducted by the message image projecting system. In FIG. 17, the vehicle 1 as the transmitter is trying to project a message image ahead of the vehicle 2 as the receiver. At a time t0, the vehicle 1 is located at a position A0. Then, the semiconductor device 200S estimates the vehicle 1 at a time t1 being a scheduled time to project the message image to be at a position A1 (Step S213). Further, the vehicle 1 decides a distance D1 forward from the estimated position A1, a distance T2 on the right side, and a reference area as a position P2 (Step S214). The position P2 is located ahead of the vehicle 2. Further, the vehicle 1 projects a reference image C20 onto the decided position P2 (Step S215). Incidentally, although the difference between the positions of the vehicle 1 due to the times in Step S213 and Step S214 is omitted for easy understanding in FIG. 17, it is controlled in consideration of the processing of these.

Refer back to FIG. 15. The semiconductor device 200S determines whether an adjustment signal is acquired from the receiver after the reference image signal is projected (Step S216). When the adjustment signal is not acquired from the receiver within a preset time, the semiconductor device 200S does not determine that the adjustment signal has been acquired (Step S216: No). In this case, the semiconductor device 200S is not capable of adjusting a message image signal. The semiconductor device 200S therefore outputs a message image signal with no adjustment to the message image projecting device 990 (Step S218). The message image projecting device 990 projects the non-adjusted message image ahead of the receiver. Thus, when the adjustment signal is not acquired within the preset time, it is possible to present a message to the receiver with appropriate timing by projecting the non-adjusted message image.

On the other hand, when the adjustment signal is acquired, the semiconductor device 200S determines that the adjustment signal has been acquired (Step S216: Yes). In this case, the semiconductor device 200S adjusts the brightness value of the message image signal on the basis of the adjustment signal acquired from the receiver (Step S217). Then, the semiconductor device 200S outputs the adjusted message image signal (Step S218). When the message image signal is output in this manner, the semiconductor device 200S completes a series of processing.

Figure 18:
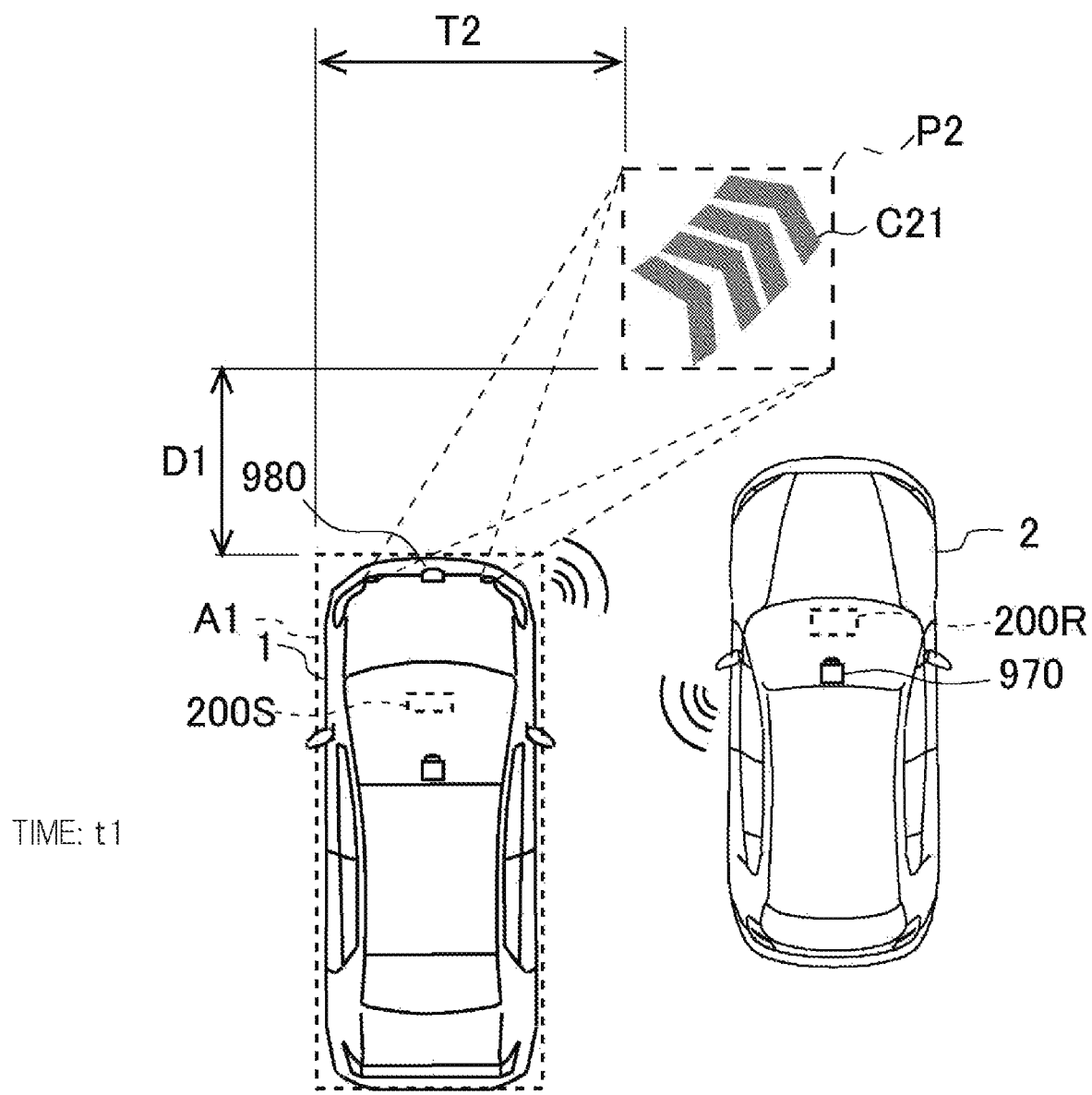
FIG. 18 is a diagram for describing message image projection conducted by the message image projecting system according to the embodiment 2.

A description will be made as to the state of Step S218 with reference to FIG. 18. FIG. 18 is a diagram for describing message image projection conducted by the message image projecting system according to the embodiment 2. As shown in FIG. 18, at a time t1, the vehicle 1 is moved to a position A1 and projects a message image C21 onto a position P2. The message image projected by the vehicle 1 is projected ahead of the vehicle 2.

Figure 16:
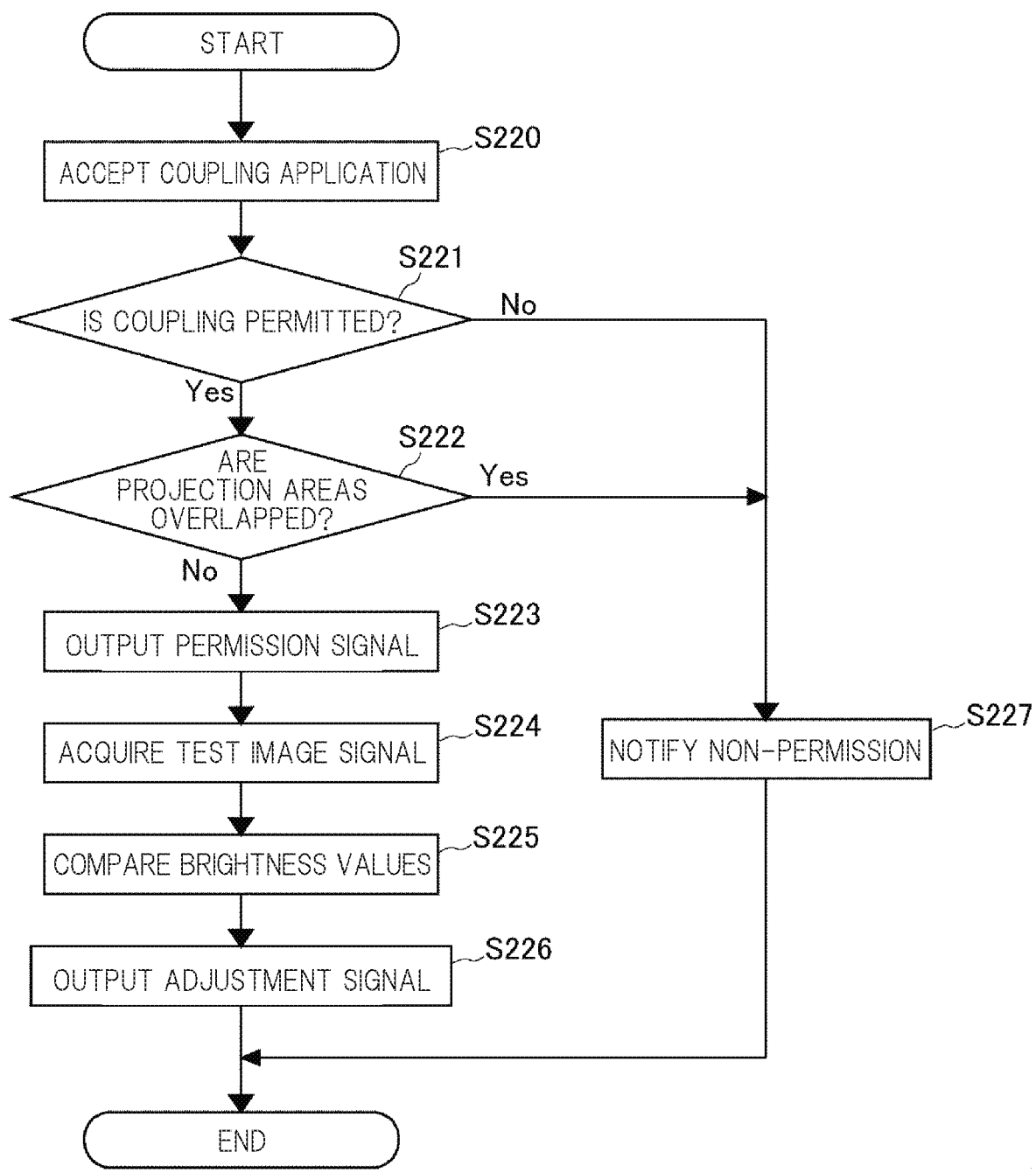
FIG. 16 is a flowchart showing processing on the message image receiver side according to the embodiment 2.

Next, a description will be made as to the processing of a message image by the receiver with reference to FIG. 16. FIG. 16 is a flowchart showing the processing on the message image receiver side according to the embodiment 2. The flowchart shown in FIG. 16 shows processing of the semiconductor device (referred to as 200R) on the message image receiver side.

First, the semiconductor device 200R accepts a coupling application from the transmitter (Step S220). A signal for the coupling application includes a signal concerning an area intended to be projected by the transmitter. Next, the semiconductor device 200R determines whether coupling is permitted (Step S221). When the coupling is not permitted due to reasons such as when the transmitter being already in communication with the other party, etc., the semiconductor device 200R does not determine the coupling permission (Step 221: No). In this case, the semiconductor device 200R transmits a notification of a coupling non-permission to the opposite party having accepted the application (Step S227) and completes a series of processing.

On the other hand, when it is determined that the coupling is permitted (Step S221: Yes), the semiconductor device 200R determines whether projection areas overlap (Step S222). For example, in FIG. 18, the vehicle 1 is projecting a message image C21 onto a position P1. In such a case, it is not allowable for the other party to further project a message image onto the area overlapped with the position P1. Thus, when it is determined that the area intended to be projected by the opposite party that applies for the coupling overlaps with a message image projection area of the other party (Step S222: Yes), the semiconductor device 200R transmits a notification of a coupling non-permission to the opposite party having accepted the application (Step S227) and completes a series of processing.

On the other hand, when it is not determined that the area overlaps with the message image projection area of the other party (Step S222: No), the semiconductor device 200R outputs a permission signal (Step S223). Then, the receiver captures a reference image projected by the transmitter through the camera 970 of the receiver. The semiconductor device 200R acquires a test image generated by the camera 970 (Step S224). Next, the semiconductor device 200R receives a reference image signal from the reference image storage area 121 and compares a brightness value of the received reference image signal with a brightness value of the acquired test image signal (Step S225). Next, the semiconductor device 200R generates an adjustment signal on the basis of the result of its comparison and outputs the generated adjustment signal to the communication device 940 (Step S226). Then, the semiconductor device 200R completes a series of processing.

FIG. 18 is a state in which after the vehicle 2 having the semiconductor device 200R has completed the series of processing shown in FIG. 16, the message image is projected from the vehicle 1. By executing such processing, the message image projecting system 20 is capable of projecting the message image which does not interfere with the receiver and suppresses deterioration in visibility.

Embodiment 3

An embodiment 3 will next be described. A message image projecting system according to the embodiment 3 is different from the embodiment 1 in that it has a function of a semiconductor device and a steering control device. The message image projecting system according to the embodiment 3 selects an area to project a message image and outputs a signal to the steering control device in such a manner that a vehicle advances to the selected area.

Figure 19:
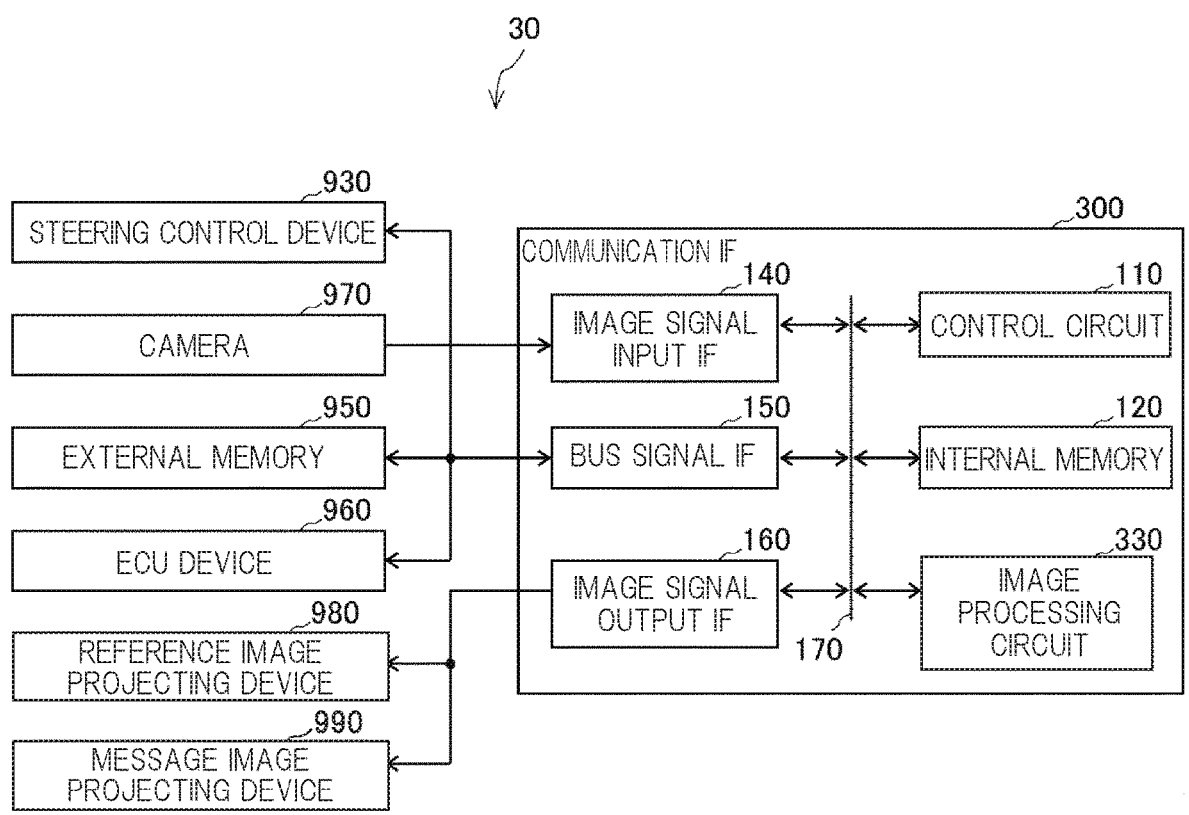
FIG. 19 is a hardware configuration diagram of a message image projecting system according to an embodiment 3.

FIG. 19 is a hardware configuration diagram of the message image projecting system according to the embodiment 3. The message image projecting system 30 shown in FIG. 19 has a steering control device 930. The steering control device 930 is a device for controlling the steering of a vehicle 1 instead of the operation of a driver, or to assist the operation of the driver. The steering control device 930 is coupled to a bus signal IF 150. Further, the message image projecting system 30 is different from the embodiment 1 in that it has a semiconductor device 300 instead of the semiconductor device 100. The semiconductor device 300 will be described later.

Figure 20:
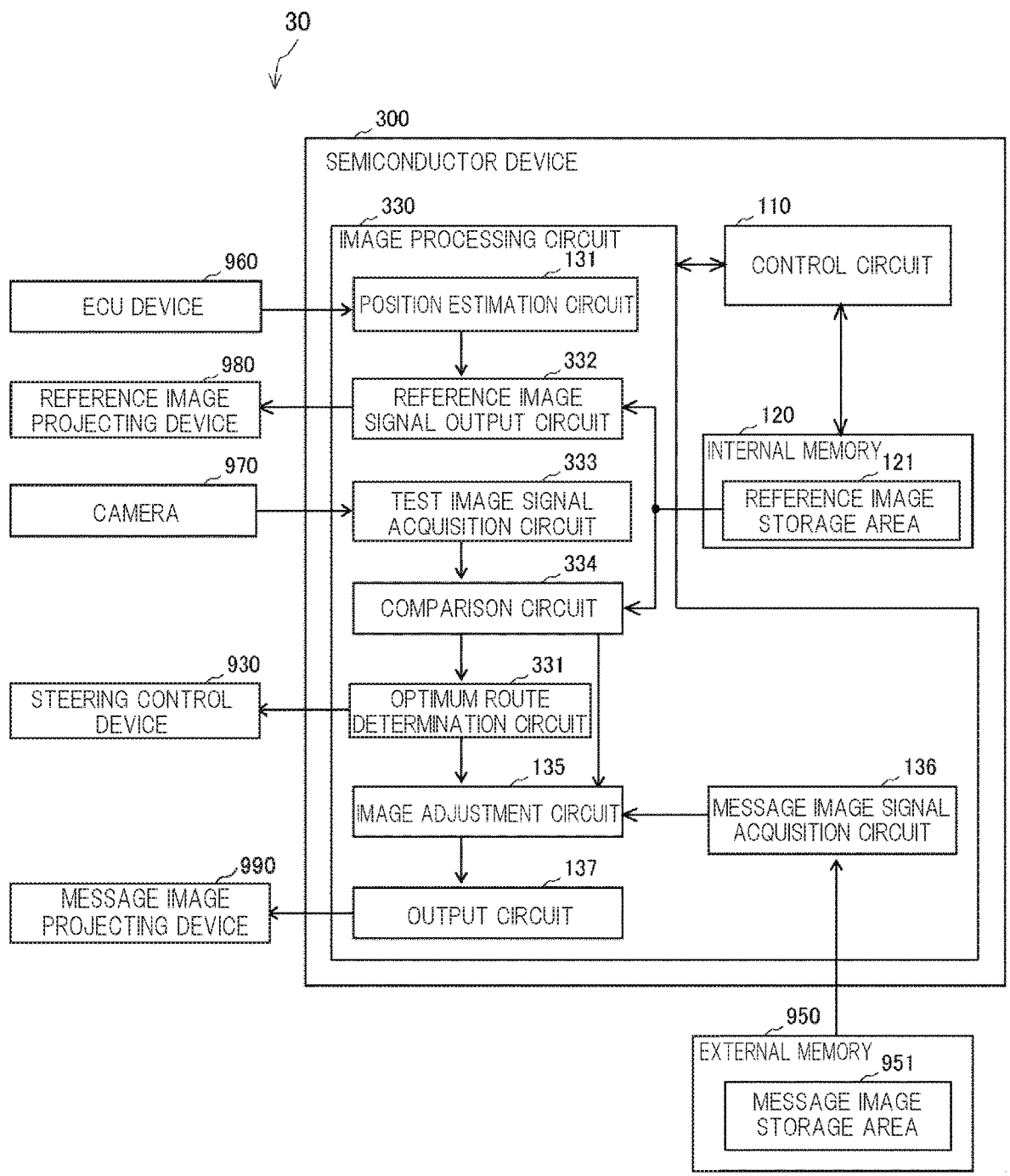
FIG. 20 is a functional block diagram of the message image projecting system according to the embodiment 3.

Each functional block of the message image projecting system 30 according to the embodiment 3 will next be described. FIG. 20 is a functional block diagram of the message image projecting system according to the embodiment 3. The semiconductor device 300 in the message image projecting system 30 is different from the semiconductor device 100 in that it has an image processing circuit 330 instead of the image processing circuit 130. A description will hereinafter be made as to points of differences from the functions described in the embodiment 1.

The image processing circuit 330 has a reference image signal output circuit 332, a test image signal acquisition circuit 333, and a comparison circuit 334 instead of the reference image signal output circuit 132, the test image signal acquisition circuit 133, and the comparison circuit 134 respectively. Further, the image processing circuit 330 has an optimum route decision circuit 331. The optimum route decision circuit 331 receives a result of comparison from the comparison circuit 334 and decides a route of the vehicle 1 on the basis of the received result of comparison. Also, the optimum route decision circuit 331 outputs information about the decided route to the steering control device 930. Further, the optimum route decision circuit 331 outputs the information about the decided route even to an image adjustment circuit 135. The image adjustment circuit 135 receives the information about the route received from the optimum route decision circuit 331 and the result of comparison received from the comparison circuit 334 and adjusts a message image signal.

Figure 21:
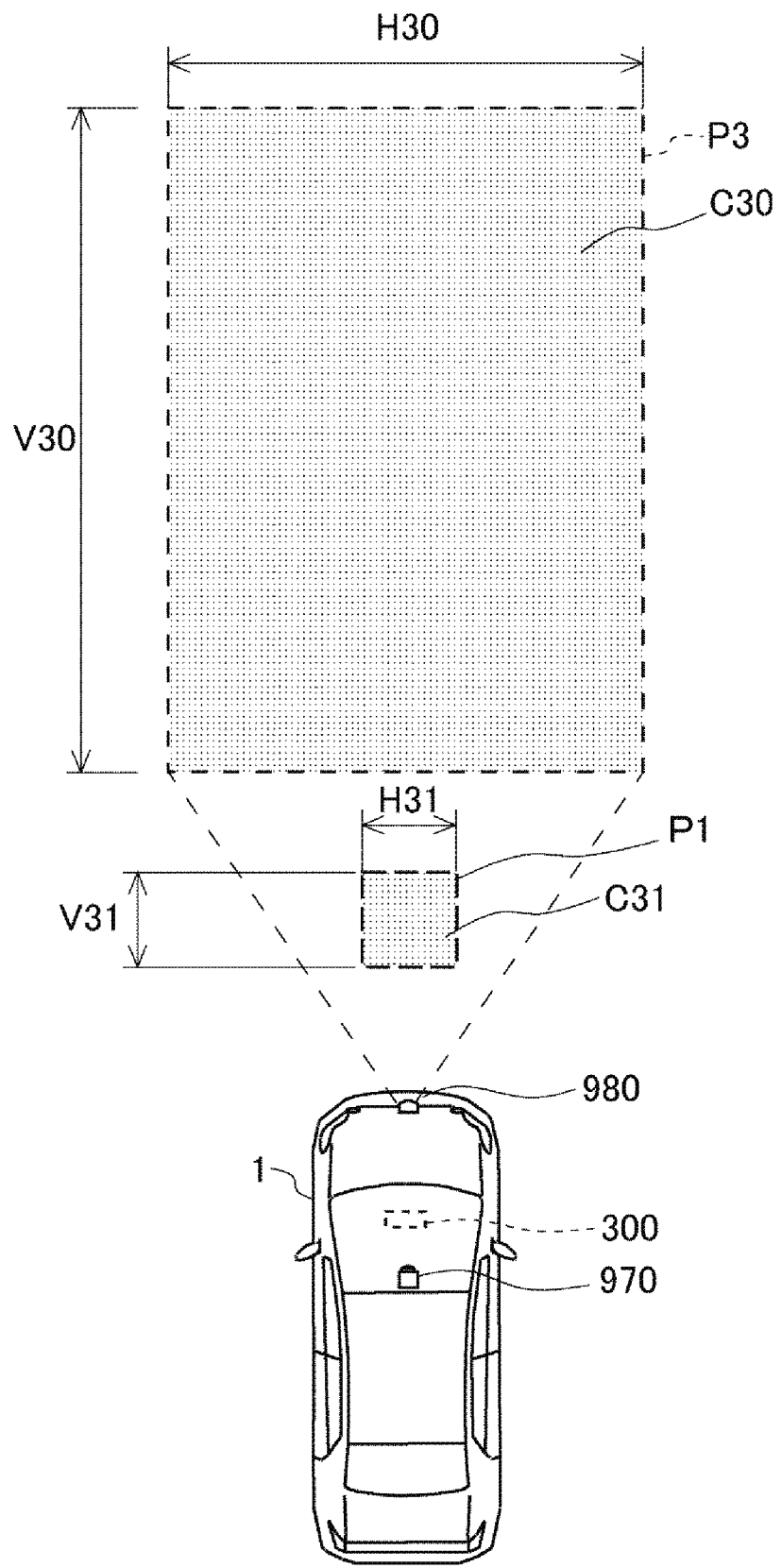
FIG. 21 is a diagram for describing reference image projection conducted by the message image projecting system.

The details of each function will next be described with reference to FIGS. 21 through 23. The reference image signal output circuit 332 will first be described with reference to FIG. 21. The reference image signal output circuit 332 outputs a reference image signal larger in width and longer in depth than the message image signal. FIG. 21 is a diagram for describing reference image projection conducted by the message image projecting system. In FIG. 21, the vehicle 1 projects a message image C31 onto a position P1 and projects a reference image C30 onto a position P3. The message image C31 has a width H31 and a depth V31. Further, the reference image C30 has a width H30 and a depth V30. As shown in FIG. 21, the reference image C30 is larger in width than the message image and longer in depth than that. The reference image signal output circuit 332 generates a reference image larger in angle of view than the message image in this manner and supplies the generated reference image to a reference image projecting device 980. The reference image C30 is projected by the reference image projecting device 980. The projected reference image C30 is captured by a camera 970. The camera 970 generates a test image signal of an image obtained by capturing the reference image C30 and supplies the same to the test image signal acquisition circuit 333.

A description will next be made as to the function of the test image signal acquisition circuit 333 with reference to FIG. 22. FIG. 22 is a diagram for describing a state in which a reference image signal is processed in a grid form. The upper side of FIG. 22 indicates an image 973 including a reference image C30 captured by the camera 970. In the image 973, a trapezoidal reference image C30 is captured ahead of the vehicle 1. When a test image signal concerning the image 973 is acquired, the test image signal acquisition circuit 333 extracts the trapezoidal reference image C30 and performs linear conversion processing thereon to form the reference image C30 into a rectangular shape. The lower side of FIG. 22 indicates a test image C32 generated by subjecting the reference image C30 to linear conversion processing. The test image C32 has the same aspect ratio as where the reference image C30 is observed from the upper surface of the vehicle 1 as shown in FIG. 21. That is, in FIG. 22, the size of the test image C32 can be assumed to have a width H30 and a depth V30. Further, the test image signal acquisition circuit 333 performs processing of dividing the test image C32 into a plurality of grids. In this case, the size of each grid is the same as that of the message image. That is, the size of one grid has a width H31 and a depth V31. In FIG. 22, the test image C32 is divided into five grids in its width direction and seven grids in its depth direction.

The functions of the comparison circuit 334 and the optimum route decision circuit 331 will next be described with reference to FIG. 23. FIG. 23 is a diagram showing an example of an optimum route calculated by the message image projecting system. The comparison circuit 334 performs comparison between the respective grids and a reference image signal respectively. In the present embodiment, the comparison circuit 334 calculates a difference between the average of brightness values of the reference image signal and the average of brightness values for each grid. The numeric value described within the frame of each grid indicates the difference between the average brightness value of the reference image signal and the average brightness value of each grid. The comparison circuit 334 supplies such a comparison result to the optimum route decision circuit 331. Incidentally, the comparison circuit 334 supplies the result of comparison to the optimum route decision circuit 331 and supplies the same even to the image adjustment circuit 135.

When the comparison result is received from the comparison circuit 334, the optimum route decision circuit 331 decides the route of the vehicle 1 on the basis of the received result of comparison. That is, the optimum route decision circuit 331 bears a function of calculating a plurality of candidate routes corresponding to candidate areas along the advancing direction of the mobile and deciding as the optimum route, the candidate route of the plural candidate routes, which is minimized in terms of the difference between the brightness values. Specifically, the optimum route decision circuit 331 selects the grids located one by one in the depth direction, of the plurality of grids included in the test image C32, in such a manner that the grids are continuously arranged.

This will be described together with a specific example. In FIG. 23, to facilitate understanding, the test image C32 is assigned addresses with respect to the respective grids. The upper left grid of the test image C32 is (X1, Y1), and the lower right grid of the test image C32 is (X5, Y7). The optimum route decision circuit 331 selects the grid of (X4, Y7) in the row of Y7. Next, the optimum route decision circuit 331 selects any of the grids of (X3, Y6), (X4, Y6), and (X5, Y6) adjacent to be continuous with (X4, Y7) in the row of Y6. The optimum route decision circuit 331 repeats similar processing up to Y7 through Y1 and decides each route along the advancing direction. The optimum route decision circuit 331 acquires the plural candidate routes in this manner. Then, the optimum route decision circuit 331 decides as the optimum route, the route, which is the smallest in terms of an integral value of the difference between the brightness values from Y7 to Y1, of the acquired plural candidate routes. A route R31 shown in FIG. 23 is the route decided by the above processing.

When the optimum route is decided, the optimum route decision circuit 331 outputs information about the decided route to the steering control device 930. The steering control device 930 performs steering of the vehicle 1 on the basis of the information about the optimum route received from the optimum route decision circuit 331. When the vehicle 1 advances on the route R31, message images are projected along the route R31. Further, signals of the message images projected onto the respective grids are respectively adjusted by the image adjustment circuit 135.

Figure 24:
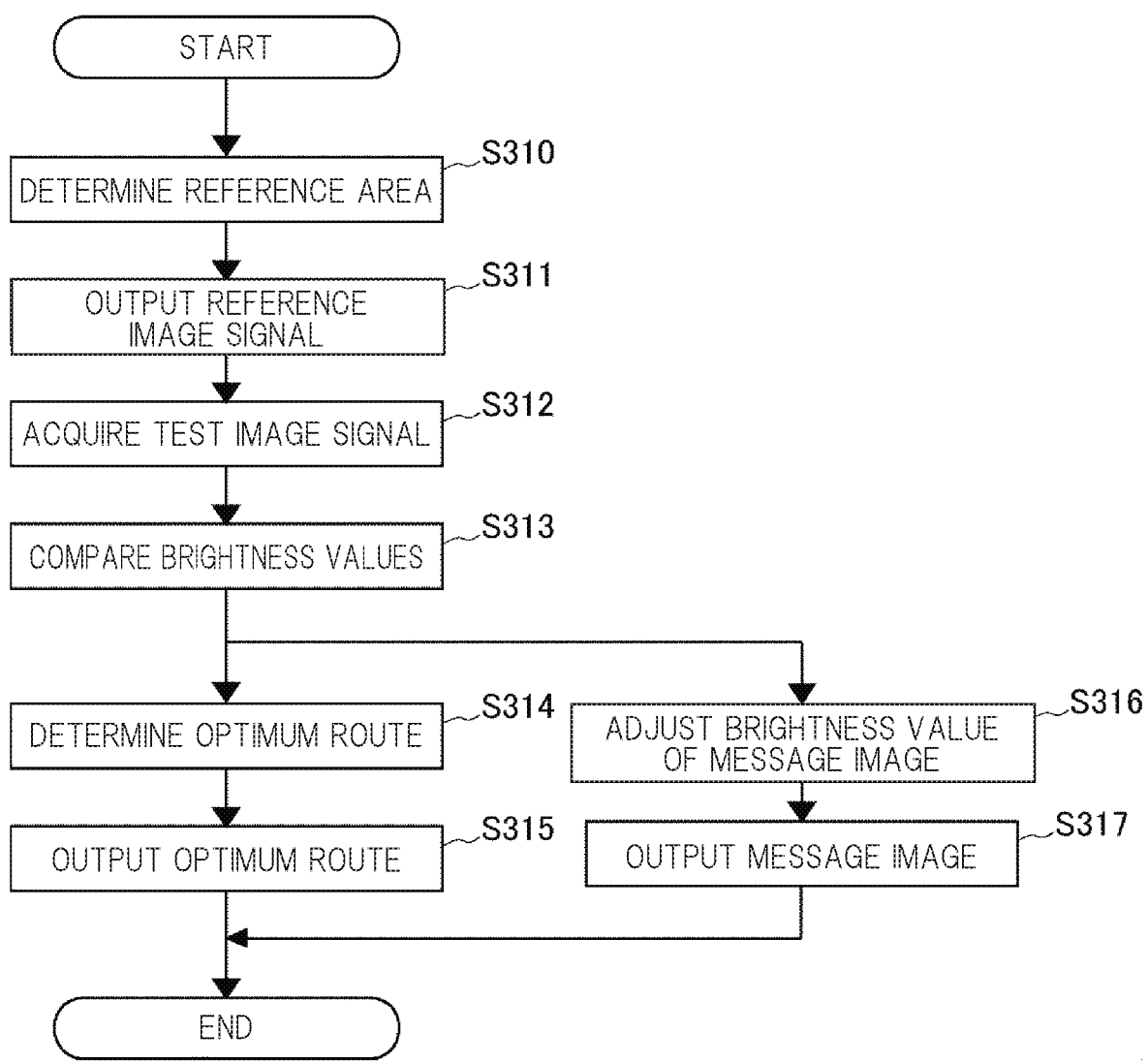
FIG. 24 is a flowchart of the message image projecting system according to the embodiment 3.

A description will next be made as to processing of the message image projecting system 30 with reference to FIG. 24. FIG. 24 is a flowchart of the message image projecting system according to the embodiment 3. The flowchart shown in FIG. 24 shows processing of the semiconductor device 300 in the message image projecting system 30.

First, the semiconductor device 300 decides a reference area (Step S310). Next, the semiconductor device 300 outputs a reference image signal concerning the decided reference area to the reference image projecting device 980 (Step S311). Next, the semiconductor device 300 acquires a test image signal from the camera 970 (Step S312). Then, the semiconductor device 300 performs comparison between the brightness values as described in FIG. 22 (Step S313). Next, the semiconductor device 300 performs the processing of deciding the optimum route and the processing of adjusting the message image respectively.

Figure 23:
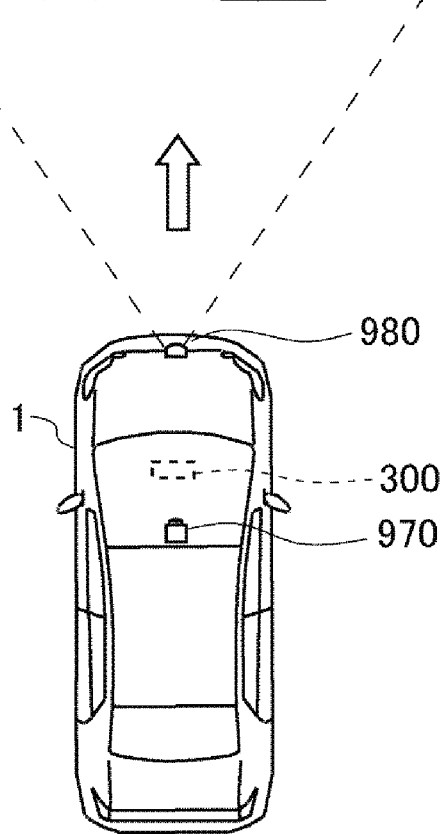
FIG. 23 is a diagram showing an example of an optimum route calculated by the message image projecting system.

As the processing of deciding the optimum route, the semiconductor device 300 performs processing to decide the optimum route as described while referring to FIG. 23 (Step S314). Then, the semiconductor device 300 outputs the optimum route to the steering control device 930 (Step S315). On the other hand, as the processing of adjusting the image, the semiconductor device adjusts the brightness value of the message image signal according to the optimum route (Step S316). Then, the semiconductor device 300 outputs the adjusted message image signal in accordance with the operating conditions of the vehicle 1 (Step S317).

A description will next be made as to the variations of the processing of the optimum route decision circuit 331 with reference to FIG. 25. FIG. 25 is a diagram for describing an example of the processing of the optimum route decision circuit. In FIG. 25, the optimum route decision circuit 331 acquires a route R31 and a route R32. Then, in the present exemplification, an integral value of a difference between brightness values from Y7 to Y4 in the route R31 is 60+78+25+50=213. On the other hand, an integral value of a difference between brightness values from Y7 to Y4 in the route R32 is 60+43+60+50=213. That is, the route R31 and the route R32 are the same in terms of the integral value of the difference between the brightness values. In such a case, the optimum route decision circuit 331 selects the route in which the maximum value of the difference is small. In the present exemplification, the optimum route decision circuit 331 compares 78 indicative of the maximum value of the route R31 with 60 indicative of the maximum value of the route R32 to select the route R32 whose maximum value is a smaller value. By providing such a function, the semiconductor device 300 is capable of preventing deterioration in the visibility of a driver or the like and selecting a route which suppresses a change in the brightness value.

Incidentally, in the above-described route selecting method, the standard deviations of the routes R31 and R32 are calculated, and the route may be selected based on the calculated standard deviations. Even when done in this way, the semiconductor device 300 is capable of preventing deterioration in the visibility of the driver or the like and selecting a route which suppresses a change in the brightness value.

Incidentally, when the optimum route decision circuit 331 decides the optimum route, the semiconductor device 300 may have the following function. That is, the semiconductor device 300 acquires a signal from a visual line detection device detecting the visual line of a person being a driver or the like and visually recognizing a message image. Then, the semiconductor device 300 may decide the optimum route in accordance with the movement of the visual line of the driver or the like. By doing in this manner, the semiconductor device 300 according to the present embodiment is capable of projecting a message image with a small burden on the driver or the like according to the movement of the visual line of the driver or the like.

Also, in the present embodiment, the test image signal acquisition circuit 133 has divided the test image into the no-overlapping grids, but may set the grids to overlap with each other. By setting the grids in this manner, the semiconductor device 300 according to the present embodiment is capable of deciding a route more enhanced in continuity.

Further, in the present embodiment, the semiconductor device 300 outputs the decided optimum route to the steering control device 930, but may output a signal indicating steering to the steering control device 930. In this case, the steering control device 930 performs the operation of the vehicle 1 on the basis of an instruction from the semiconductor device 300.

Although the invention made above by the present inventors has been described specifically on the basis of the preferred embodiments, the present invention is not limited to the already-mentioned embodiments. It is needless to say that various changes can be made thereto within the scope not departing from the gist thereof.

Some or all of the above embodiments can be also described as in the following appendices, but are not limited to the following.

(Appendix 1)

A semiconductor device outputting a message image signal being a signal of a message image to be projected onto a projection area defined by a relative relation with a mobile, including:

a memory which stores a reference image signal being a signal of a reference image set in advance;

a test image signal input interface which acquires a test image signal being a signal of an image obtained by imaging a reference area onto which the reference image is projected; and a processor which estimates a position of the mobile at a scheduled time to project the message image on the basis of movement information of the mobile, decides a reference area being an area to project the preset reference image on the basis of a relative positional relation between the mobile and the projection area at the estimation position, and outputs a reference image signal being a signal of a reference image corresponding to the reference area, acquires a test image signal being a signal of an image obtained by imaging the reference area onto which the reference image is projected, compares the reference image signal with the test image signal, adjusts the message image signal, based on the result of comparison, and outputs the adjusted message image signal.

(Appendix 2)

A projecting system including a semiconductor device, and a projecting device mounted in the mobile and projecting a message image, in which the semiconductor device outputs a message image signal being a signal of a message image to be projected onto a projection area defined by a relative relation with the mobile and includes a position estimation part which estimates a position of the mobile at a scheduled time to project the message image on the basis of movement information of the mobile, a reference image signal output part which decides a reference area being an area to project a preset reference image on the basis of a relative positional relation between the mobile and the projection area at the estimation position, and outputs a reference image signal being a signal of a reference image corresponding to the reference area, a test image signal acquisition part which acquires a test image signal being a signal of a test image obtained by imaging the reference area onto which the reference image is projected, a comparison part which compares the reference image signal with the test image signal, an image adjustment part which adjusts the message image signal, based on the result of comparison, and a message image output part which outputs the adjusted message image signal.

What is claimed is:

1. A semiconductor device outputting a message image signal being a signal of a message image to be projected onto a projection area located at a predetermined distance from a mobile, the semiconductor device comprising:
    a position estimation circuit which calculates an estimation position of the mobile at a scheduled time to project the message image based on movement information of the mobile;
    a reference image signal output circuit which decides a reference area being an area to project a reference image based on a relative positional relation between the mobile at the estimation position and the projection area, and outputs a reference image signal being a signal of the reference image to be projected onto the reference area;
    a test image signal acquisition circuit which acquires a test image signal being a signal of a test image obtained by imaging the reference area onto which the reference image is projected;
    a comparison circuit which compares the reference image signal with the test image signal;
    an image adjustment circuit which adjusts the message image signal based on comparing the reference image signal with the test image signal; and
    a message image output circuit which outputs the message image signal adjusted by the image adjustment circuit.

2. The semiconductor device according to claim 1, wherein the reference image signal output circuit decides a time to output the reference image signal, based on the estimation position.

3. The semiconductor device according to claim 1, wherein the image adjustment circuit adjusts a pixel value included in the message image signal.

4. The semiconductor device according to claim 1, wherein the reference image signal output circuit outputs the reference image signal in which brightness values of red, green, and blue are equal to each other.

5. The semiconductor device according to claim 1, wherein the comparison circuit compares a brightness value included in the reference image signal with a brightness value included in the test image signal to calculate a difference between the brightness values.

6. The semiconductor device according to claim 5, wherein the comparison circuit makes an angle of view of the reference image and an angle of view of the test image correspond to each other and compares the reference image signal and the test image signal for each pixel.

7. The semiconductor device according to claim 6, wherein the image adjustment circuit makes an angle of view of the test image and an angle of view of the message image correspond to each other and adjusts the message image signal for each pixel of the message image signal.

8. The semiconductor device according to claim 1, further including an optimum projection area decision circuit,
    wherein the reference image signal output circuit outputs a reference image signal having a width larger than that of the message image,
    wherein the comparison circuit extracts a plurality of candidate areas each having the same width as the message image and at different positions in a width direction of the reference image, and calculates a difference in brightness value between the reference image signal and the test image signal for each candidate area, and
    wherein the optimum projection area decision circuit decides as an optimum projection area, one of the candidate areas, in which the difference in brightness value is minimum.

9. The semiconductor device according to claim 1, further including an adjustment signal acquisition circuit which acquires an adjustment signal corresponding to a reference image projected by the mobile from a target moved around the mobile, and
    wherein the image adjustment circuit adjusts a message image based on the adjustment signal acquired from the target.

10. The semiconductor device according to claim 9, further including a permission determination circuit which determines whether the target permits projection of the reference image.

11. The semiconductor device according to claim 9, wherein the adjustment signal acquisition circuit acquires a signal for adjusting a pixel value included in the message image signal.

12. The semiconductor device according to claim 9, wherein the position estimation circuit estimates a position of the mobile and a position of the target at the schedule time to project the message image based on the movement information of the mobile and movement information of the target respectively.

13. The semiconductor device according to claim 9, wherein the adjustment signal acquisition circuit acquires a signal for performing trapezoidal correction on the message image signal.

14. The semiconductor device according to claim 1, further including an adjustment signal output circuit,
    wherein the test image signal acquisition circuit acquires a sample image signal being a signal of an image obtained by capturing a sample image projected by a projecting device moved around the mobile,
    wherein the comparison circuit compares the reference image signal with the sample image signal, and
    wherein the adjustment signal output circuit outputs an adjustment signal for adjusting the sample image signal based on a result of comparison between the reference image signal and the sample image signal.

15. The semiconductor device according to claim 14, further including a permission signal output circuit which outputs a signal to permit projection of the sample image to the projecting device when the projecting device projects the sample image.

16. The semiconductor device according to claim 1, further including an optimum route decision circuit,
   wherein the reference image signal output circuit outputs a reference image signal larger in width than the message image and longer in length than the message image in a depth direction,
   wherein the comparison circuit extracts a plurality of candidate areas at an angle of view corresponding to the message image and at different positions with respect to the reference image and calculates a difference in brightness value between the reference image signal and the test image signal for each candidate area, and
   wherein the optimum route decision circuit calculates a plurality of candidate routes corresponding to the candidate areas along an advancing direction of the mobile and decides as an optimum route, the candidate route in which the difference in brightness value is minimum, of the candidate routes.

17. The semiconductor device according to claim 16, wherein the optimum route decision circuit performs trapezoidal correction on the test image signal, divides the test image into a plurality of grids, and calculates a route corresponding to each divided grid.

18. The semiconductor device according to claim 16, further including a steering instruction circuit which gives instruction to steer the mobile, based on the optimum route.

19. A message image signal output method of outputting a message image signal being a signal of a message image to be projected onto a projection area located at a predetermined distance from a mobile, the method comprising:
   calculating an estimation position of the mobile at a scheduled time to project the message image based on movement information of the mobile;
   deciding a reference area being an area to project a reference image based on a relative positional relation between the mobile at the estimation position calculated by the calculating and the projection area;
   outputting a reference image signal being a signal of the reference image to be projected onto the reference area;
   acquiring a test image signal being a signal of a test image obtained by imaging the reference area onto which the reference image is projected;
   comparing the reference image signal with the test image signal;
   adjusting the message image signal based on a comparison result between the reference image signal and the test image signal; and
   outputting the adjusted message image signal.

* * * * *